United States Patent
Zhou et al.

(10) Patent No.: US 11,166,244 B2
(45) Date of Patent: Nov. 2, 2021

(54) SIGNALING OF TRANSMIT POWER RELATED INFORMATION

(71) Applicant: QUALCOMM Incorporated, San Diego, CA (US)

(72) Inventors: Yan Zhou, San Diego, CA (US); Bin Tian, San Diego, CA (US); Gwendolyn Denise Barriac, Encinitas, CA (US); Alfred Asterjadhi, San Diego, CA (US); Simone Merlin, San Diego, CA (US); George Cherian, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 16/775,125

(22) Filed: Jan. 28, 2020

(65) Prior Publication Data

US 2020/0169964 A1    May 28, 2020

Related U.S. Application Data

(62) Division of application No. 15/711,956, filed on Sep. 21, 2017, now Pat. No. 10,616,838.

(Continued)

(51) Int. Cl.
*H04W 52/34* (2009.01)
*H04W 52/26* (2009.01)
(Continued)

(52) U.S. Cl.
CPC ........... *H04W 52/34* (2013.01); *H04W 52/20* (2013.01); *H04W 52/225* (2013.01);
(Continued)

(58) Field of Classification Search
CPC . H04W 52/20; H04W 52/225; H04W 52/241; H04W 52/242; H04W 52/262;
(Continued)

(56) References Cited

U.S. PATENT DOCUMENTS 6,643,469 B1 * 11/2003 Gfeller ............... H04B 10/1143
                                                           398/162
6,907,229 B2    6/2005 Shpak
(Continued)

FOREIGN PATENT DOCUMENTS

| CN | 101043500 A | 9/2007 |
|----|-------------|--------|
| CN | 102281518 A | 12/2011 |

(Continued)

OTHER PUBLICATIONS

International Preliminary Report on Patentability—PCT/US2017/053023, The International Bureau of WIPO—Geneva, Switzerland, dated Sep. 19, 2018.

(Continued)

*Primary Examiner* — Tan H Trinh
(74) *Attorney, Agent, or Firm* — Arent Fox, LLP

(57) ABSTRACT

A method, an apparatus, and a computer-readable medium for wireless communication are provided. In one aspect, the example method may include generating a data frame including a Medium Access Control (MAC) header or a physical layer (PHY) header. The MAC header or the PHY header of the data frame may include transmit power related information. The transmit power related information may include at least one of: a maximum transmit power, power backoff per modulation and coding scheme information, or an actual transmit power. The method may include transmitting the data frame to a second device.

30 Claims, 16 Drawing Sheets

Related U.S. Application Data

(60) Provisional application No. 62/407,049, filed on Oct. 12, 2016.

(51) Int. Cl.
| | |
|---|---|
| *H04W 52/36* | (2009.01) |
| *H04W 60/00* | (2009.01) |
| *H04W 52/20* | (2009.01) |
| *H04W 52/22* | (2009.01) |
| *H04W 52/24* | (2009.01) |
| *H04W 52/54* | (2009.01) |

(52) U.S. Cl.
CPC ....... *H04W 52/242* (2013.01); *H04W 52/262* (2013.01); *H04W 52/365* (2013.01); *H04W 60/00* (2013.01); *H04W 52/241* (2013.01); *H04W 52/367* (2013.01); *H04W 52/54* (2013.01)

(58) Field of Classification Search
CPC . H04W 52/34; H04W 52/365; H04W 52/367; H04W 52/54; H04W 60/00
USPC ....... 455/69, 127.1, 522; 370/252, 329, 336, 370/338
See application file for complete search history.

(56) References Cited

U.S. PATENT DOCUMENTS

| | | | |
|---|---|---|---|
| 8,655,396 B2 | 2/2014 | Malladi et al. | |
| 8,792,930 B1 | 7/2014 | Gopalakrishnan et al. | |
| 10,091,726 B2* | 10/2018 | Park | H04W 52/0235 |
| 10,231,194 B2* | 3/2019 | Zhou | H04W 52/225 |
| 10,616,838 B2* | 4/2020 | Zhou | H04W 52/20 |
| 2004/0203689 A1 | 10/2004 | Backes et al. | |
| 2007/0082620 A1 | 4/2007 | Zhang et al. | |
| 2008/0049654 A1 | 2/2008 | Otal et al. | |
| 2009/0191910 A1 | 7/2009 | Athalye et al. | |
| 2009/0257357 A1* | 10/2009 | Marsh | H04W 28/18 370/252 |
| 2009/0305742 A1 | 12/2009 | Caballero et al. | |
| 2010/0035653 A1 | 2/2010 | Chang et al. | |
| 2011/0122805 A1 | 5/2011 | Abraham et al. | |
| 2011/0188486 A1* | 8/2011 | Kim | H04W 52/146 370/338 |
| 2011/0207493 A1 | 8/2011 | Taoka et al. | |
| 2011/0243208 A1 | 10/2011 | Shany et al. | |
| 2011/0280169 A1 | 11/2011 | Seo et al. | |
| 2011/0287804 A1 | 11/2011 | Seo et al. | |
| 2011/0305209 A1 | 12/2011 | Merlin et al. | |
| 2011/0319120 A1 | 12/2011 | Chen et al. | |
| 2012/0063433 A1* | 3/2012 | Wentink | H04B 7/0697 370/338 |
| 2012/0115536 A1 | 5/2012 | Vermani et al. | |
| 2013/0044681 A1 | 2/2013 | Abraham et al. | |
| 2013/0070716 A1 | 3/2013 | Kwon et al. | |
| 2013/0121203 A1* | 5/2013 | Jung | H04W 52/365 370/252 |
| 2013/0142098 A1* | 6/2013 | Kwon | H04W 52/04 370/311 |
| 2013/0230035 A1* | 9/2013 | Grandhi | H04W 48/16 370/338 |
| 2013/0258968 A1 | 10/2013 | Hong et al. | |
| 2014/0038587 A1 | 2/2014 | Murgan et al. | |
| 2014/0105186 A1* | 4/2014 | Park | H04W 52/244 370/336 |
| 2014/0219223 A1 | 8/2014 | Baldemair et al. | |
| 2014/0315592 A1* | 10/2014 | Schlub | H04B 1/3838 455/522 |
| 2014/0329551 A1 | 11/2014 | Ryoo et al. | |
| 2015/0050929 A1 | 2/2015 | Song et al. | |
| 2015/0063190 A1 | 3/2015 | Merlin et al. | |
| 2015/0063275 A1* | 3/2015 | Yi | H04W 52/54 370/329 |
| 2015/0146607 A1 | 5/2015 | Abraham et al. | |
| 2015/0288501 A1* | 10/2015 | Kwon | H04L 1/1614 370/329 |
| 2015/0319700 A1* | 11/2015 | Oteri | H04W 52/10 455/127.1 |
| 2015/0381254 A1* | 12/2015 | Liang | H04B 7/0619 370/329 |
| 2016/0128004 A1* | 5/2016 | Lee | H04W 52/146 370/311 |
| 2016/0212749 A1 | 7/2016 | Abraham et al. | |
| 2016/0242127 A1* | 8/2016 | Takeda | H04W 52/365 |
| 2016/0261327 A1 | 9/2016 | Merlin et al. | |
| 2016/0270027 A1* | 9/2016 | Ang | H04W 76/27 |
| 2016/0270102 A1* | 9/2016 | Zeng | H04W 72/048 |
| 2016/0309457 A1 | 10/2016 | Eitan et al. | |
| 2016/0329929 A1* | 11/2016 | Kenney | H04L 5/0012 |
| 2017/0019865 A1* | 1/2017 | Wang | H04W 52/241 |
| 2017/0041111 A1 | 2/2017 | Yi et al. | |
| 2017/0086148 A1 | 3/2017 | Jung et al. | |
| 2017/0099669 A1 | 4/2017 | Jung et al. | |
| 2017/0105217 A1* | 4/2017 | Kwon | H04W 52/244 |
| 2017/0141874 A1 | 5/2017 | Di Taranto et al. | |
| 2017/0141875 A1 | 5/2017 | Eliaz et al. | |
| 2017/0142659 A1 | 5/2017 | Noh et al. | |
| 2017/0303280 A1 | 10/2017 | Chun et al. | |
| 2018/0103434 A1* | 4/2018 | Zhou | H04W 52/262 |
| 2018/0103438 A1* | 4/2018 | Zhou | H04W 52/34 |
| 2018/0227882 A1 | 8/2018 | Freda et al. | |
| 2018/0242358 A1* | 8/2018 | Tomeba | H04W 52/346 |
| 2018/0332540 A1* | 11/2018 | Lou | H04W 74/006 |
| 2019/0246312 A1* | 8/2019 | Kim | H04W 52/365 |
| 2020/0107270 A1* | 4/2020 | Lou | H04W 52/246 |

FOREIGN PATENT DOCUMENTS

| | | |
|---|---|---|
| CN | 102291813 A | 12/2011 |
| CN | 102301800 A | 12/2011 |
| CN | 104170269 A | 11/2014 |
| CN | 104718790 A | 6/2015 |
| EP | 2244392 A2 | 10/2010 |
| EP | 2375832 A2 | 10/2011 |
| EP | 2996380 A1 | 3/2016 |
| WO | 2011159122 A2 | 12/2011 |
| WO | 2012112807 A1 | 8/2012 |
| WO | 2012128549 A2 | 9/2012 |

OTHER PUBLICATIONS

International Preliminary Report on Patentability—PCT/US2017/053030, The International Bureau of WIPO—Geneva, Switzerland, dated Sep. 19, 2018.

International Search Report and Written Opinion—PCT/US2017/053023—ISA/EPO—dated Nov. 10, 2017.

International Search Report and Written Opinion—PCT/US2017/053030—ISA/EPO—dated Nov. 10, 2017.

\* cited by examiner

350 ⬈

380 ⬈

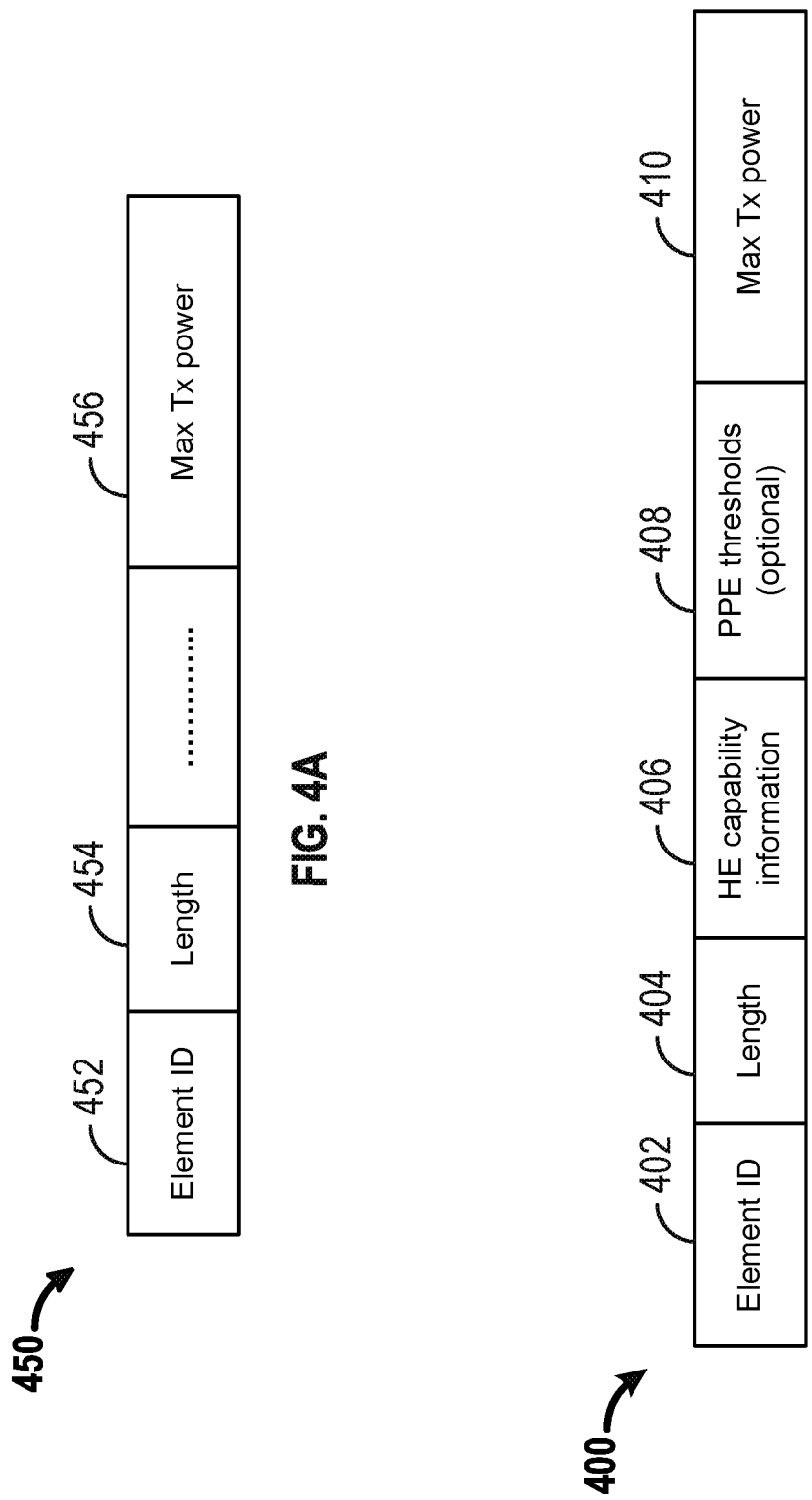

US 11,166,244 B2

SIGNALING OF TRANSMIT POWER RELATED INFORMATION

CROSS-REFERENCE TO RELATED APPLICATION(S)

This application is a Divisional of U.S. patent application Ser. No. 15/711,956, entitled "SIGNALING OF TRANSMIT POWER RELATED INFORMATION" and filed on Sep. 21, 2017, which claims the benefit of U.S. Provisional Application Ser. No. 62/407,049, entitled "SIGNALING OF TRANSMIT POWER RELATED INFORMATION" and filed on Oct. 12, 2016, which is expressly incorporated by reference herein in its entirety.

BACKGROUND

Field

The present disclosure relates generally to communication systems, and more particularly, to signaling and/or processing of transmit power related information for wireless local area networks.

Background

In many telecommunication systems, communications networks are used to exchange messages among several interacting spatially-separated devices. Networks may be classified according to geographic scope, which may be, for example, a metropolitan area, a local area, or a personal area. Such networks may be designated respectively as a wide area network (WAN), metropolitan area network (MAN), local area network (LAN), wireless local area network (WLAN), or personal area network (PAN). Networks may also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks may be preferred when the network elements are mobile and thus have dynamic connectivity needs, or if the network architecture is formed in an ad hoc, rather than fixed, topology. Wireless networks may employ intangible physical media in an unguided propagation mode using electromagnetic waves in the radio, microwave, infra-red, optical, etc., frequency bands. Wireless networks may advantageously facilitate user mobility and rapid field deployment when compared to fixed wired networks.

An access point (AP) may need a station's (STA) transmit power related information to predict UL Signal to Interference plus Noise Ratio (SINR) and modulation and coding scheme (MCS). However, a STA may apply different power backoffs for different MCSs to prevent a power amplifier from entering a non-linear state which may further vary based on the STA's vendor, e.g., different vendors may have different backoff values which may not be known by the AP.

Therefore, there is a need for signaling power backoff per MCS so that a receiver may better predict an MCS that could be used at the receiver.

SUMMARY

The systems, apparatuses, computer program products, and methods of this disclosure each have several aspects, no single one of which is solely responsible for the desirable attributes disclosed herein.

One aspect of this disclosure provides an apparatus (e.g., a station or an access point) for wireless communication. The apparatus may be configured to receive, at a receiver, transmit power related information from a transmitter, wherein the transmit power related information includes at least one of a maximum transmit power, a power backoff per MCS, or an actual transmit power. The receiver may estimate, at the receiver, an MCS for an uplink transmission from the transmitter based at least on the received transmit power related information.

Another aspect of this disclosure provides an apparatus (e.g., a station or an access point) for wireless communication. The apparatus may be configured to receive transmit power related information corresponding to a second apparatus. The transmit power related information may include power backoff per modulation and coding scheme information. The power backoff per modulation and coding scheme information may include a first plurality of power backoffs including a first power backoff corresponding to a first modulation and coding scheme and a second power backoff corresponding to a second modulation and coding scheme. Each power backoff of the first plurality of power backoffs may be a function of at least one of: a respective bandwidth or a respective number of spatial streams. The apparatus may be configured to determine, based on the first power backoff corresponding to the first modulation and coding scheme, a first signal to interference plus noise ratio (SINR) for the first modulation and coding scheme of a second plurality of power backoffs. The second plurality of power backoffs may be a subset of the first plurality of power backoffs. Each power backoff of the second plurality of power backoffs may be a function of at least one of: a first bandwidth or a first number of spatial streams. The apparatus may be configured to select, based on the first SINR, the first modulation and coding scheme for scheduling an uplink transmission with the second apparatus in accordance with the first modulation and coding scheme.

Another aspect of this disclosure provides an apparatus (e.g., a station or an access point) for wireless communication. The apparatus may be configured to receive a data frame including a Medium Access Control (MAC) header or a physical layer (PHY) header. The MAC header or the PHY header of the data frame may include transmit power related information corresponding to a second apparatus. The transmit power related information may include at least one of: a maximum transmit power, power backoff per modulation and coding scheme information, or an actual transmit power. The apparatus may be configured to select, based on the transmit power related information, a first modulation and coding scheme for scheduling an uplink transmission with the second apparatus in accordance with the first modulation and coding scheme.

Another aspect of this disclosure provides an apparatus (e.g., a station or an access point) for wireless communication. The apparatus may be configured to generate a message including transmit power related information corresponding to the apparatus. The transmit power related information may include power backoff per modulation and coding scheme information. The power backoff per modulation and coding scheme information may include a plurality of power backoffs including a first power backoff corresponding to a first modulation and coding scheme and a second power backoff corresponding to a second modulation and coding scheme. Each power backoff of the plurality of power backoffs may be a function of at least one of: a respective bandwidth or a respective number of spatial streams. The apparatus may be configured to transmit the message to a second apparatus.

Another aspect of this disclosure provides an apparatus (e.g., a station or an access point) for wireless communication. The apparatus may be configured to generate a data frame including a Medium Access Control (MAC) header or a physical layer (PHY) header. The MAC header or the PHY header of the data frame may include transmit power related information corresponding to the apparatus. The transmit power related information may include at least one of: a maximum transmit power, power backoff per modulation and coding scheme information, or an actual transmit power. The apparatus may be configured to transmit the data frame to a second apparatus.

BRIEF DESCRIPTION OF THE DRAWINGS

FIG. 4A illustrates an example frame structure in accordance with the techniques described herein.

FIG. 4B illustrates an example frame structure in accordance with the techniques described herein.

DETAILED DESCRIPTION

Figure 1:
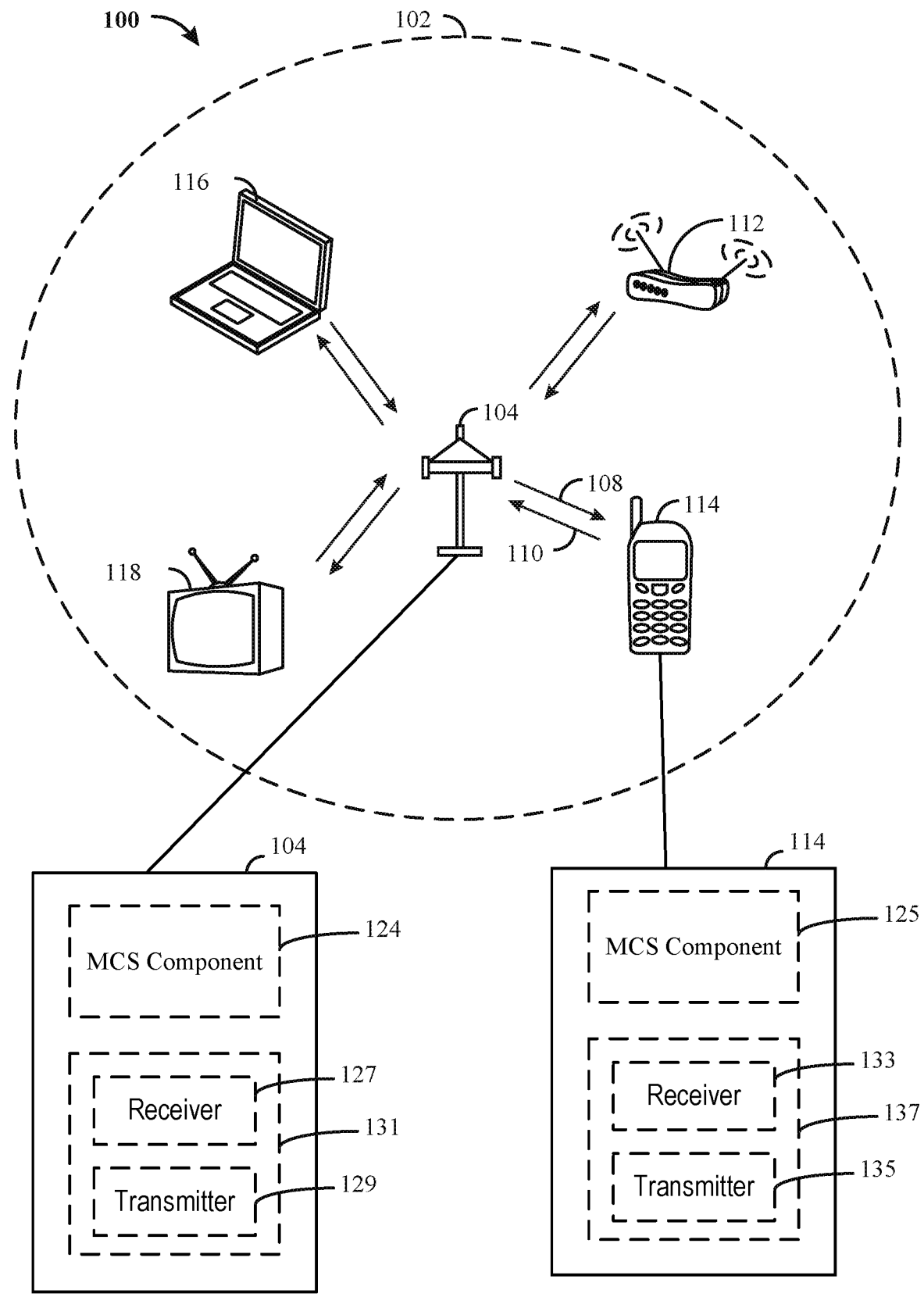
FIG. 1 illustrates an example wireless communication system in which aspects of the present disclosure may be employed.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. Any aspect disclosed herein may be embodied by one or more elements of a claim.

Although particular aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an IEEE 802.11 protocol using orthogonal frequency-division multiplexing (OFDM), direct-sequence spread spectrum (DSSS) communications, a combination of OFDM and DSSS communications, or other schemes. Implementations of the IEEE 802.11 protocol may be used for sensors, metering, and smart grid networks. Aspects of certain devices implementing the IEEE 802.11 protocol may consume less power than devices implementing other wireless protocols, and/or may be used to transmit wireless signals across a relatively long range, for example about one kilometer or longer.

A WLAN may include various devices that access the wireless network. For example, there may be two types of devices: access points (APs) and clients (also referred to as stations or "STAs"). In general, an AP may serve as a hub or base station for the WLAN and a STA serves as a client of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain connectivity to the Internet or to other wide area networks. In some aspects, a STA may also be used as an AP.

An access point may also be referred to as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also be referred to as an access terminal (AT), a subscriber station, a subscriber unit, a mobile station, a remote station, a remote terminal, a user terminal, a user agent, a user device, a user equipment, or some other terminology. In some implementations, a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects disclosed herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

In an aspect, MIMO schemes may be used for wide area WLAN (e.g., Wi-Fi) connectivity. MIMO may exploit a radio-wave characteristic called multipath. In multipath, transmitted data may bounce off objects (e.g., walls, doors, furniture), reaching the receiving antenna multiple times through different routes and at different times. A WLAN device that employs MIMO may split a data stream into multiple parts, called spatial streams (or multi-streams), and transmit each spatial stream through separate antennas to corresponding antennas on a receiving WLAN device. Additionally, the growth in MIMO schemes has led to the emergence of multi-user (MU) MIMO schemes which support multiple connections on a single channel (e.g., a single conventional channel) where different STAs are identified by spatial signatures.

The term "associate," or "association," or any variant thereof should be given the broadest meaning possible within the context of the present disclosure. By way of example, when a first apparatus associates with a second apparatus, the two apparatuses may be directly associated or intermediate apparatuses may be present. For purposes of brevity, the process for establishing an association between two apparatuses will be described using a handshake protocol that utilizes an "association request" by one of the apparatus followed by an "association response" by the other apparatus. The handshake protocol may utilize other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, any combination thereof (e.g., A-B, A-C, B-C, and A-B-C), or multiple instances of an item (e.g., A-A-B-C).

As discussed above, certain devices described herein may employ a communication protocol specified by an IEEE 802.11 standard, for example. Such devices (whether used as a STA, an AP, or other device) may be used for smart metering or used in a smart grid network. Such devices may provide sensor applications or may act as sensors as well or may be used in home automation. The devices may be used in a healthcare context, for example for personal healthcare. The devices may also be used for surveillance, be used to enable extended-range Internet connectivity (e.g. for use with hotspots), or for machine-to-machine communications.

FIG. 1 illustrates an example wireless communication system 100 in which aspects of the present disclosure may be employed. The wireless communication system 100 may operate pursuant to a wireless standard, for example the IEEE 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDMA/MU-MIMO techniques. In such a case, the wireless communication system 100 may be referred to as an OFDMA/MU-MIMO system. Alternatively, signals may be sent and received between the AP 104 and the STAs in accordance with CDMA techniques. In such a case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast traffic (e.g., communications), multicast traffic, and/or broadcast traffic.

In some aspects, the AP 104 may suppress adjacent channel interference (ACI) so that the AP 104 may receive UL communications on more than one channel concurrently while reducing analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) may be the coverage area of an AP (e.g., the AP 104). The AP 104 along with the STAs associated with the AP 104 and that use the AP 104 for communication may be referred to as a basic service set (BSS). The wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100. The beacon signal may help the other nodes (STAs)

synchronize their timing with the AP 104. Alternatively or additionally, the beacon signal may provide other information or functionality. Such beacons may be transmitted periodically. In one aspect, the period between successive transmissions of a beacon may be referred to as a super-frame. Transmission of a beacon may be divided into a number of groups or intervals. In one aspect, the beacon may include, but is not limited to, such information as timestamp information to set a common clock, a peer-to-peer network identifier, a device identifier, capability information, a super-frame duration, transmission direction information, reception direction information, a neighbor list, and/or an extended neighbor list, some of which are described in additional detail below. Thus, a beacon may include information that is common (e.g., shared) amongst several devices and information specific to a given device.

In some aspects, a STA (e.g., STA 114) may associate with the AP 104 in order to send communications to and/or to receive communications from the AP 104. In one aspect, information for associating may be included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit, for example, an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. The AP 104 includes a receiver 127 and a transmitter 129. The receiver 127 may be configured to perform any receiving function described herein. In some examples, the receiver 127 may be configured to receive transmit power related information as described herein. For example, the receiver 127 may be configured to receive transmit power related information from a transmitter (e.g., a transmitter of the STA 114). The transmitter 129 may be configured to perform any transmitting function described herein. In some examples, the transmitter 129 may be configured to send transmit power related information as described herein. The receiver 127 and the transmitter 129 may be combined into a transceiver 131.

In some examples, the AP 104 may include an MCS component 124 configured to perform any processing (e.g., functions, steps, or the like) described herein with respect to transmit power related information. For example, the MCS component 124 may be configured to estimate an MCS supported by the transmitter from which transmit power related information was received based on the received transmit power related information. In some examples, estimating an MCS may be described as selecting an MCS. For example, the MCS component 124 may be configured to select an MCS for scheduling a transmission (e.g., an uplink transmission) with a device associated with the transmitter (e.g., the STA 114) in accordance with the selected MCS. In such an example, the selected MCS may constitute an estimated or otherwise calculated MCS based on transmit power related information. The MCS component 124 may be configured to select the MCS from a plurality of MCSs based on received transmit power related information. For example, the MCS component 124 may be configured to process transmit power related information in accordance with the techniques described herein. Based on the processing of the transmit power related information, the MCS component 124 may be configured to select an MCS for scheduling a transmission as described herein.

In another aspect, the STA 114 may include one or more components for performing various functions. The STA 114 includes a receiver 133 and a transmitter 135. The receiver 133 may be configured to perform any receiving function described herein. In some examples, the receiver 133 may be configured to receive transmit power related information as described herein. For example, the receiver 133 may be configured to receive transmit power related information from a transmitter (e.g., a transmitter of the AP 104). The transmitter 135 may be configured to perform any transmitting function described herein. In some examples, the transmitter 135 may be configured to send transmit power related information as described herein. The receiver 133 and the transmitter 135 may be combined into a transceiver 137.

In some examples, the STA 114 may include an MCS component 125 configured to perform any processing (e.g., functions, steps, or the like) described herein with respect to transmit power related information. For example, the MCS component 125 may be configured to estimate an MCS supported by the transmitter from which transmit power related information was received based on the received transmit power related information. In some examples, estimating an MCS may be described as selecting an MCS. For example, the MCS component 125 may be configured to select an MCS for scheduling a transmission (e.g., an uplink transmission) with a device associated with the transmitter (e.g., the AP 104) in accordance with the selected MCS. In such an example, the selected MCS may constitute an estimated or otherwise calculated MCS based on transmit power related information. The MCS component 125 may be configured to select the MCS from a plurality of MCSs based on received transmit power related information. For example, the MCS component 125 may be configured to process transmit power related information in accordance with the techniques described herein. Based on the processing of the transmit power related information, the MCS component 125 may be configured to select an MCS for scheduling a transmission as described herein.

Figure 2:
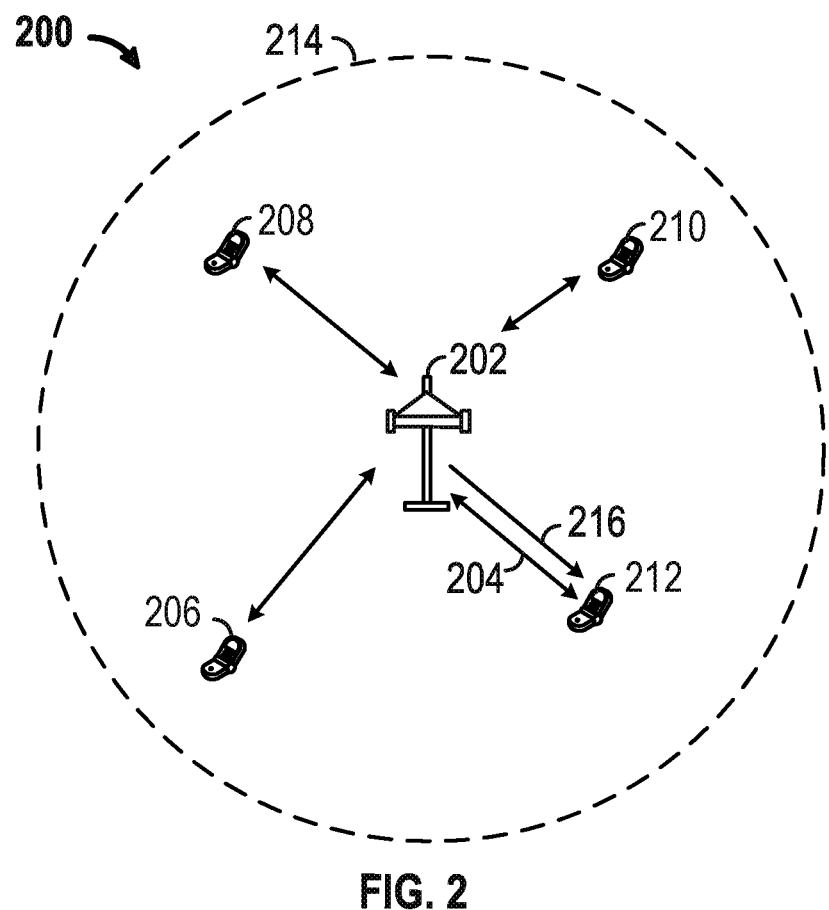
FIG. 2 illustrates an example wireless network in accordance with the techniques described herein.

FIG. 2 illustrates an example wireless network 200 (e.g., a Wi-Fi network employing the IEEE 802.11 standard) in accordance with the techniques described herein. The diagram 200 illustrates an AP 202 broadcasting/transmitting within a service area 214. STAs 206, 208, 210, and 212 are within the service area 214 of the AP 202 (although only four STAs are shown in FIG. 2, more or less STAs may be within the service area 214). The AP 202 may transmit (e.g., broadcast) a trigger frame 216 to STAs 206, 208, 210, and 212. In an aspect, the trigger frame 216 may include configuration information for each of the STAs 206, 208, 210, and 212. The configuration information may, in some examples, trigger MU-MIMO transmission of STAs 206, 208, 210, and 212. The STAs 206, 208, 210, and 212 may communicate by exchanging frames 204, illustrated only for STA 212 for simplicity. In some instances, the STA 212, for example, may transmit the frames 204 to the AP 202 in response to the received trigger frame 216. In other instances, STAs 206, 208, 210, and 212 may transmit the frames 204 to the AP 202 via a resource allocated by the AP 202. In some other instances, the frames 204 may be exchanged between the AP 202 and the STA 206 without a trigger frame.

As described herein, one or more STAs (e.g., one or more STAs 206, 208, 210, and 212) may be configured to send transmit power related information to an AP (e.g., AP 202). The AP may be configured to process the transmit power related information as described herein. For example, based on the transmit power related information (e.g., or based the processing of the transmit power related information), the AP may be configured to select a respective MCS for scheduling an uplink transmission with one or more respective STAs of the one or more STAs from which transmit power related information was received. For example, the AP 202 may be configured to receive transmit power related information corresponding to STA 212. The AP 202 may be configured to select an MCS based on the power related information received from the STA 212. The AP 202 may transmit scheduling information including the selected MCS to the STA 212 to schedule an uplink transmission with the STA 212 in accordance with the selected MCS. In some examples, the scheduling information may be carried by the trigger frame 216.

The AP 202 and the STAs 206, 208, 210, and 212 may be configured to operate in the same way or a similar manner as any other AP (e.g., AP 104) or STA (e.g., STA 112) described herein.

For example, the AP 202 may include an MCS component configured to perform any processing (e.g., functions, steps, or the like) described herein with respect to transmit power related information. For example, the MCS component may be configured to estimate an MCS supported by the transmitter from which transmit power related information was received based on the received transmit power related information. In some examples, estimating an MCS may be described as selecting an MCS. For example, the MCS component may be configured to select an MCS for scheduling a transmission (e.g., an uplink transmission) with a device associated with the transmitter (e.g., one of the STAs 206, 208, 210, and 212) in accordance with the selected MCS. In such an example, the selected MCS may constitute an estimated or otherwise calculated MCS based on transmit power related information. The MCS component may be configured to select the MCS from a plurality of MCSs based on received transmit power related information. For example, the MCS component may be configured to process transmit power related information in accordance with the techniques described herein. Based on the processing of the transmit power related information, the MCS component may be configured to select an MCS for scheduling a transmission as described herein.

As another example, each of the STAs 206, 208, 210, and 212 may include an MCS component configured to perform any processing (e.g., functions, steps, or the like) described herein with respect to transmit power related information. For example, the MCS component may be configured to estimate an MCS supported by the transmitter from which transmit power related information was received based on the received transmit power related information. In some examples, estimating an MCS may be described as selecting an MCS. For example, the MCS component may be configured to select an MCS for scheduling a transmission (e.g., an uplink transmission) with a device associated with the transmitter (e.g., the AP 202) in accordance with the selected MCS. In such an example, the selected MCS may constitute an estimated or otherwise calculated MCS based on transmit power related information. The MCS component may be configured to select the MCS from a plurality of MCSs based on received transmit power related information. For example, the MCS component may be configured to process transmit power related information in accordance with the techniques described herein. Based on the processing of the transmit power related information, the MCS component may be configured to select an MCS for scheduling a transmission as described herein.

FIGS. 3A, 3B, 4A, 4B, 5A, 5B, 6A, and 6B illustrate various examples of different frame structures in accordance with the techniques described herein. For example, the example fields and/or information elements depicted in FIGS. 3A, 3B, 4A, 4B, 5A, 5B, 6A, and 6B may be configured to carry transmit power related information as described herein. In some examples, the example fields and/or information elements depicted in FIGS. 3A, 3B, 4A, 4B, 5A, 5B, 6A, and 6B may be various examples of fields and/or information elements within frames 204 depicted in FIG. 2. In other examples, the example fields and/or information elements depicted in FIGS. 3A, 3B, 4A, 4B, 5A, 5B, 6A, and 6B may be various examples of fields and/or information elements that may be transmitted and/or received by any device (e.g., any AP or STA) described herein. As used herein, a frame structure may, in some examples, refer to an information element, a field, or a sub-field in a frame that may be used to carry information, such as transmit power related information described herein.

Figure 3A:
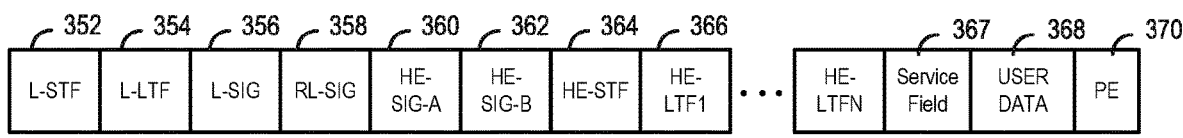
FIG. 3A illustrates an example frame structure in accordance with the techniques described herein.

FIG. 3A illustrates an example frame structure in accordance with the techniques described herein. For example, FIG. 3A illustrates a frame 350 that may be used for transmitting information in a wireless network (e.g., wireless communication system 100 or wireless network 200). In some examples, the frame 350 may be used to transmit data or symbols (e.g., OFDM/OFDMA symbols) such as data symbols or training field symbols, which may include long training field (LTF) symbols and short training field (STF) symbols. The frame 350 may include a preamble and data. The preamble may be considered a header of the frame 350. The preamble may include information identifying a modulation and coding scheme, a transmission rate, and a length of time to transmit the frame 350, and other information. For example, the preamble may include a legacy preamble that may contain header information for older Wi-Fi standards to enable products incompatible with newer Wi-Fi standards to decode the frame 350. The legacy preamble may include a legacy short training field (L-STF) 352, a legacy long training field (L-LTF) 354, a legacy signal field (L-SIG) 356, a repetition L-SIG (RL-SIG) 358, and/or other fields. In some examples, the L-STF 352 may have an 8 μs duration, the L-LTF 354 may have an 8 μs duration, and the L-SIG 356 and RL-SIG may each have an 4 μs duration. In such examples, other durations may also be used. Each of the various fields in the legacy preamble may include one or more OFDM symbols. The L-STF 352 may be used for packet detection, to setup automatic gain control (AGC), to acquire coarse frequency offset, and for timing synchronization. The L-LTF 274 may include information needed for a receiver (e.g., the STA 206 or the AP 202) to perform channel estimation and for fine frequency offset estimation. The L-SIG 356 and/or the RL-SIG 358 may be used to provide transfer rate and length information.

In addition to the legacy preamble, the preamble may include a high efficiency (HE) preamble. The HE preamble may contain header information related to a future or a new Wi-Fi standard (e.g., the IEEE 802.11ax standard). The HE preamble may include an HE signal A (HE-SIG-A) field 360, an HE signal B (HE-SIG-B) field 362, an HE short training field (HE-STF) 364, an HE long training field (HE-LTF) 366 with 1 to N symbols where N is an integer greater than 0, and/or other fields. The HE-STF 364 may be used to improve AGC. The HE-SIG-A 360 and the HE-SIG-B 362 may be used to provide transfer rate and length information.

The HE-LTF 366 of frame 350 may be used for channel estimation. The number of symbols in the HE-LTF 366 may be equal to or greater than the number of space-time streams from different STAs. For example, if there are 4 STAs, there may be 4 LTF symbols (i.e., HE-LTF1, HE-LTF2, HE-LTF3, and HE-LTF4). The frame 350 may include a service field 367 that carries a scrambler seed and a number of reserved bits which may be used, for example, for reporting power headroom. As used herein, the term "reporting" and the like (e.g., "report") may refer to the sending, carrying, or transmission of the referenced information. For example, reporting power headroom may refer to the sending or otherwise transmission of the power headroom. As another example, a frame structure or frame for carrying power headroom may refer to a frame structure or frame configured to carry or otherwise include the power headroom.

The frame 350 may also include a data field 368 that may contain the user data to be communicated, such as between the STA 206, for example, and the AP 202. In some examples, the frame 350 may be referred to as a data frame because it may contain data to be communicated from a first device (e.g., an AP disclosed herein) to a second device (e.g., a STA disclosed herein). The data field 368 may include one or more data symbols. The frame 350 may also include a packet error (PE) field 370, which may include a frame check sequence (FCS) or other error detection or error correction information. In an aspect, the frame 350 may correspond to an HE multi-user (MU) physical layer convergence procedure (PLCP) protocol data unit (PPDU) (HE-MU-PPDU).

Figure 3B:
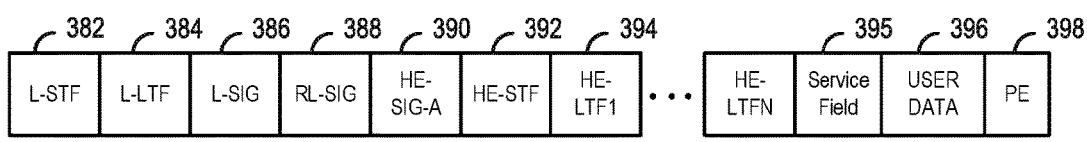
FIG. 3B illustrates an example frame structure in accordance with the techniques described herein.

FIG. 3B illustrates an example frame structure in accordance with the techniques described herein. For example, FIG. 3B illustrates a frame 380 that may be used for transmitting information in a wireless network (e.g., wireless communication system 100 or wireless network 200). The frame 380 has a different configuration than the frame 350. The frame 380 may include a preamble that includes an L-STF 382, an L-LTF 384, L-SIG 386, an RL-SIG 388, an HE-SIG-A 390, an HE-STF 392, and/or one or more HE-LTF 394 fields. The frame 380 may include a service field 395 that carries a scrambler seed and a number of reserved bits which may be used, for example, for reporting power headroom. The frame 380 may further include a user data field 396 and a PE field 398. Unlike the frame 350, the frame 380 may not have an HE-SIG-B field.

In some examples, fields such as HE-SIG-A 360, service field 367, and/or a MAC header of user data field 368 of the frame 350 may be used to carry transmit power related information disclosed herein. In some examples, fields such as HE-SIG-A 390, service field 395, and/or a MAC header of user data field 396 of the frame 380 may be used to carry transmit power related information disclosed herein.

FIG. 4A illustrates an example frame structure in accordance with the techniques described herein. For example, FIG. 4A illustrates an example frame structure 450 for reporting the maximum transmit power (which may also be referred to as maximum transmit power information) of a STA to an AP. In some examples, the frame structure 450 may be an information element (IE) with a plurality of fields. The IE may be a high efficiency (HE) IE. In some examples, the HE IE may be an HE capability IE. One or more fields of the plurality of fields may be used to carry or otherwise report transmit power related information (e.g., maximum transmit power of a STA) to an AP. In some examples, the frame structure 450 may include a field, such as field 456 with the example name of "Max Tx Power," configured to carry the maximum transmit power of a STA. For example, the STA may be configured to report (e.g., send or otherwise transmit) the maximum transmit power of the STA to an AP via field 456 of the IE. In some examples, the maximum transmit power may be reported to the AP via a message from the STA to the AP. The Element ID field 452 may indicate the identification (ID) of the frame structure 450 and the field Length 454 may indicate the length of the frame structure 450. For example, where the frame structure is an IE, the Element ID field 452 may indicate the ID of the IE and the Length field 454 may indicate the length of the IE.

FIG. 4B illustrates an example frame structure in accordance with the techniques described herein. For example, FIG. 4B illustrates an example frame structure 400 for reporting the maximum transmit power (which may also be referred to as maximum transmit power information) of a STA to an AP. In some examples, the frame structure 400 may be an information element (IE) with a plurality of fields. The IE may be a high efficiency (HE) IE. In some examples, the HE IE may be an HE capability IE. In such examples, the HE capability IE may be named HE Transmit Power Info IE or another name. One or more fields of the plurality of fields may be used to carry or otherwise report transmit power related information (e.g., maximum transmit power of a STA) to an AP. In some examples, the frame structure 400 may include a field, such as field 410 with the example name of "Max Tx Power," configured to carry the maximum transmit power of a STA. For example, a STA (e.g., STA 114) may be configured to report (e.g., send or otherwise transmit) the maximum transmit power of the STA to an AP via field 410 of the IE. In such an example where the frame structure 400 is an HE capability IE, the STA may be configured to report (e.g., send or otherwise transmit) the maximum transmit power of the STA to an AP via field 410 of the HE capability IE.

In some examples, maximum transmit power information may comprise thirteen bits. For example, thirteen bits may be used to express the maximum transmit power range, for example, from −20 to 30 decibel-milliwatts (dBm) with one 1 dBm step size. In such examples, the field 456 depicted in FIG. 4A and the field 410 depicted in FIG. 4B may be thirteen bits in length or otherwise have a length large enough to carry thirteen bits. In some examples, an AP (e.g., AP 104 or AP 202) may notify a STA (e.g., STA 114 or one of STAs 208-212) which IE should be used for sending the maximum transmit power of the STA. For example, an AP (e.g., AP 104) may be configured to notify a STA (e.g., STA 114) regarding whether the STA should use frame structure 450 (e.g., an IE in some examples), frame structure 400 (e.g., an HE capability IE in some examples), or some other IE for sending the maximum transmit power of the STA to the AP. In some examples, an AP (e.g., AP 104) may be configured to notify the STA by broadcasting from the AP via a beacon, a probe, or an association request/response. For example, the beacon, probe, or association request/response may include maximum transmit power information of a STA, which may be included in a field (e.g., such as field 456 in frame structure 450 or field 410 in frame structure 400) in the beacon, probe, association request/response, or a management frame.

Referring to FIG. 4B, the Element ID field 402 may indicate the ID of the frame structure 400, the Length field 404 may indicate the length of the frame structure 400, the HE capability information field 406 may indicate features and capabilities of the transmitting node (e.g., STA), and the PPE thresholds field 408 may indicate thresholds used for packet extension computation at a receiver (e.g., an AP).

As used herein, an MCS may refer to an MCS index value. For example, MCS0 may refer to an MCS index value of 0 and MCSN may refer to an MCS index value N, wherein N is zero or positive integer. An MCS (or MCS index value) may have associated therewith a modulation scheme (which may also be referred to as a modulation type) and a coding scheme (which may also be referred to as a coding type or a coding rate). In some examples, the modulation scheme may include any modulation scheme, such as Binary Phase-Shift Keying (BPSK) modulation, Quadrature Phase Shift Keying (QPSK) modulation, quadrature amplitude modulation (QAM) modulation (e.g., 16-QAM modulation or 64-QAM modulation). In some examples, the coding scheme/rate may include any coding scheme/rate, such as P/M where P and M are each a positive integer. In some examples, P may equal M. In other examples, P may be less than M. Example coding schemes/rates may include ¼, ½, ¾, ⅓, ⅔, ⅙, ⅚, ⅛, ⅜, ⅝, and ⅞. In some examples, MCS (or MCS index value) may have associated therewith a data rate. For example, MCS0 may correspond to a first data rate and MCS1 may correspond to a second data rate In this example, a STA transmitting information in accordance with MCS0 may refer to the STA transmitting information at the first data rate. As used herein, reference to power backoff per MCS information may refer to power backoff information corresponding to one or more MCSs. For example, a first power backoff may correspond to a first MCS and a second power backoff may correspond to a second MCS. In some examples, the power backoff information may correspond to one or more MCSs and additional information, such as bandwidth (e.g., bandwidth of a Wi-Fi channel), a number of spatial streams, and/or a precoding matrix. In some examples, power backoff per MCS information may refer to a transmit power backoff from a maximum transmit power to prevent the transmitter (e.g., the power amplifier (PA) of the transmitter) from entering a non-linear state.

Figure 5A:
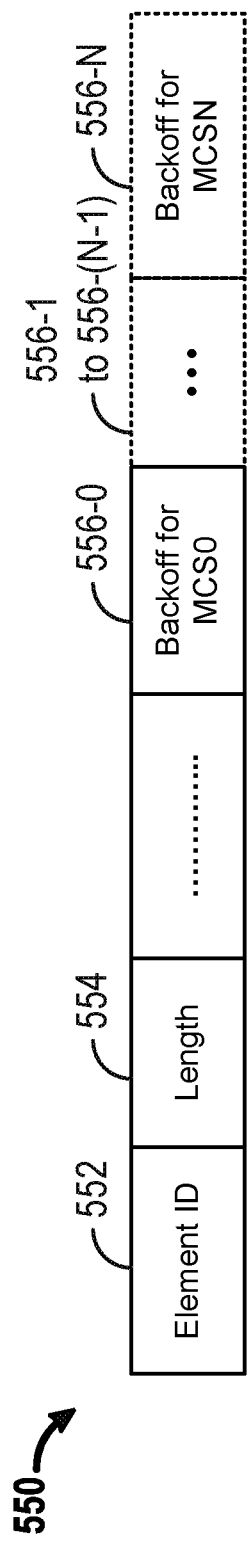
FIG. 5A illustrates an example frame structure in accordance with the techniques described herein.

FIG. 5A illustrates an example frame structure in accordance with the techniques described herein. For example, FIG. 5A illustrates an example frame structure 550 for reporting the power backoff per MCS (which may also be referred to as power backoff per MCS information) from a transmitter to a receiver (e.g., from a STA to an AP). In some examples, the frame structure 550 may be an information element (IE) with a plurality of fields. The IE may be a high efficiency (HE) IE. In some examples, the HE IE may be an HE capability IE. One or more fields of the plurality of fields may be used to carry or otherwise report transmit power related information (e.g., power backoff per MCS information) to an AP. In some examples, the frame structure 550 may include a one or more fields to carry power backoff per MCS information corresponding to a STA. In some examples, a power backoff per MCS may be represented by a single octet (8 bits). In other examples, a power backoff per MCS may be represented by less than 8 bits or more than 8 bits.

In the example of FIG. 5A, power backoff per MCS fields 556-0 to 556-N (where N is any positive integer) are shown. Each of fields 556-0 to 556-N may be configured to carry or otherwise include power backoff per MCS information. For example, field 556-0 may be configured to carry the power backoff information corresponding to a first MCS (e.g., MCS0) and field 556-N may be configured to carry the Nth power backoff information corresponding to the Nth MCS (e.g., MCSN). Example fields between 556-0 and 556-N are shown by the reference 556-1 to 556-(N−1), where 556-(N−1) represents the field preceding field 556-N. As an example, where N=15, the frame structure may include 16 power backoff per MCS fields. In such an example, field 556-0 may be configured to carry the power backoff information corresponding to a first MCS (e.g., MCS0), field 556-1 may be configured to carry the power backoff information corresponding to a second MCS (e.g., MCS1), field 556-2 may be configured to carry the power backoff information corresponding to a third MCS (e.g., MCS2), and the like.

In some examples, the power backoff per MCS information may be reported via a message. For example, the message may include the frame structure 550 including the power backoff per MCS information. For example, an AP may be configured to transmit the message containing the power backoff per MCS information to a STA. As another example, a STA may be configured to transmit the message containing the power backoff per MCS information an AP. In some examples, certain power backoffs for reference MCSs may be signaled (e.g. transmitted to a receiving device), and one or more power backoffs corresponding to one or more MCSs may be interpolated (e.g., by the receiving device) based on the signaled power backoff information for the reference MCSs. For example, a power backoff of 1 dB for reference MCS3 and a power backoff of 3 dB for reference MCS5 may be signaled and power backoff of 2 dB may be interpolated for MCS4 (which may not be signaled). For example, an MCS component of the receiving device of transmit power related information (e.g., an AP or a STA) may be configured to interpolate one or more power backoffs based on received power backoff per MCS information. In some examples, the Element ID field 552 may indicate the ID of the frame structure 550 and the Length field 554 may indicate the length of the length of the frame structure 550. For example, where the frame structure is an IE, the Element ID field 552 may indicate the ID of the IE and the Length field 554 may indicate the length of the IE.

In some examples, the power backoff per MCS information described in this disclosure may be a function of bandwidth (e.g., bandwidth of a Wi-Fi channel), a number of spatial streams, and/or a precoding matrix. The power backoff per MCS information being a function of bandwidth, a number of spatial streams, or a precoding matrix may refer to the power backoff information for each MCS being dependent upon, being based on, or otherwise corresponding to bandwidth, a number of streams, a precoding matrix, or any combination thereof. For example, a power backoff that is a function of bandwidth may be described as a bandwidth dependent power backoff. As another example, a power backoff that is a function of a number of spatial streams may be described as a spatial stream dependent power backoff. As another example, a power backoff that is a function of a pre-coding matrix may be described as a precoding matrix dependent power backoff. As another example, a power backoff that is a function of bandwidth and a number of spatial streams may be described as a bandwidth and spatial stream dependent power backoff. As another example, a power backoff that is a function of a number of spatial streams and a precoding matrix may be described as a spatial stream and precoding matrix dependent power backoff. As another example, a power backoff that is a function of of bandwidth and a precoding matrix may be described as a bandwidth and precoding matrix dependent power backoff. As another example, a power backoff that is a function of bandwidth, a number of spatial streams, and a precoding matrix may be described as a bandwidth, spatial stream, and pre-coding matrix dependent power backoff.

In some examples, the bandwidth may refer to the bandwidth that a STA (or any device described herein configured to send power backoff per MCS information) may be configured to send or otherwise transmit information (e.g., uplink data) to an AP (or any device described herein configured to receive power backoff per MCS information). For example, different power backoffs (which may also be referred to as power backoff values) may correspond to different bandwidths. Otherwise described, different power backoffs may be a function of different bandwidths. The different bandwidths may correspond to different communication channels. Example bandwidths may include 2.5 MHz, 5 MHz, 10 MHz, 20 MHz, 40 MHz, 80 MHz, or 160 MHz. In some examples, the number of spatial streams may refer to a number of Multiple-Input-Multiple-Output (MIMO) spatial streams or any number of spatial streams that a STA (or any device described herein configured to send power backoff per MCS information) may be configured to send or otherwise transmit information (e.g., uplink data) to an AP (or any device described herein configured to receive power backoff per MCS information). The precoding matrix may refer to an M×N matrix for multiplexing data symbols from different spatial streams onto one or more antennas. In some examples, M may refer to M transmit antennas (where M is a positive integer) and N may refer to N spatial streams (where N is a positive integer). Each respective spatial stream of the N spatial streams may include a plurality of data symbols.

For example, the power backoff for a particular MCS may vary based on or otherwise be a function of the bandwidth, the number of spatial streams, and/or a precoding matrix. In such an example, each of power backoff per MCS fields 556-0 through 556-N may include one or more subfields or otherwise be associated with a particular bandwidth and/or a particular number of spatial streams. For example, the frame structure 550 may be configured to carry power backoff per MCS information corresponding to one or more bandwidths and/or one or more number of spatial streams. As an example, field 556-0 may be configured to carry the power backoff information corresponding to a first MCS (e.g., MCS0) and a first bandwidth (e.g., 10 MHz), field 556-1 may be configured to carry the power backoff information corresponding to the first MCS (e.g., MCS0) and a second bandwidth (e.g., 20 MHz), field 556-2 may be configured to carry the power backoff information corresponding to the first MCS (e.g., MCS0) and a third bandwidth (e.g., 30 MHz), field 556-3 may be configured to carry the power backoff information corresponding to a second MCS (e.g., MCS1) and the first bandwidth (e.g., 10 MHz), field 556-4 may be configured to carry the power backoff information corresponding to the second MCS (e.g., MCS1) and the second bandwidth (e.g., 20 MHz), and field 556-5 may be configured to carry the power backoff information corresponding to the second MCS (e.g., MCS1) and the third bandwidth (e.g., 30 MHz).

In other examples, the frame structure 550 may carry power backoff information corresponding to one or more MCSs, one or more bandwidths, and/or one or more number of spatial streams. As an example, field 556-0 may be configured to carry the power backoff information corresponding to a first MCS (e.g., MCS0) and a first number of spatial streams (e.g., 1 spatial stream), field 556-1 may be configured to carry the power backoff information corresponding to the first MCS (e.g., MCS0) and a second number of spatial streams (e.g., 2 spatial streams), field 556-2 may be configured to carry the power backoff information corresponding to the first MCS (e.g., MCS0) and a third number of spatial streams (e.g., 3 spatial streams), field 556-3 may be configured to carry the power backoff information corresponding to a second MCS (e.g., MCS1) and the first number of spatial streams (e.g., 1 spatial stream), field 556-4 may be configured to carry the power backoff information corresponding to the second MCS (e.g., MCS1) and the second number of spatial streams (e.g., 2 spatial streams), and field 556-5 may be configured to carry the power backoff information corresponding to the second MCS (e.g., MCS1) and the third number of spatial streams (e.g., 3 spatial streams).

As another example, field 556-0 may be configured to carry the power backoff information corresponding to a first MCS (e.g., MCS4), a first bandwidth (e.g., 2.5 MHz), and a first number of spatial streams (e.g., 1 spatial stream); field 556-1 may be configured to carry the power backoff information corresponding to the first MCS (e.g., MCS4), a second bandwidth (e.g., 5 MHz), and the first number of spatial streams (e.g., 1 spatial stream); field 556-2 may be configured to carry the power backoff information corresponding to the first MCS (e.g., MCS4), the first bandwidth (e.g., 2.5 MHz), and a second number of spatial streams (e.g., 2 spatial streams); field 556-3 may be configured to carry the power backoff information corresponding to a second MCS (e.g., MCS7), the first bandwidth (e.g., 2.5 MHz), and the first number of spatial streams (e.g., 1 spatial stream); field 556-4 may be configured to carry the power backoff information corresponding to the second MCS (e.g., MCS7), the second bandwidth (e.g., 5 MHz), and the first number of spatial streams (e.g., 1 spatial stream); and field 556-5 may be configured to carry the power backoff information corresponding to the second MCS (e.g., MCS7), the first bandwidth (e.g., 2.5 MHz), and the second number of spatial streams (e.g., 2 spatial streams).

As another example, field 556-0 may be configured to carry the power backoff information corresponding to a first MCS (e.g., MCS2), a first bandwidth (e.g., 40 MHz), a first number of spatial streams (e.g., 1 spatial stream), and a first pre-coding matrix; and field 556-1 may be configured to carry the power backoff information corresponding to a second MCS (e.g., MCS3), the first bandwidth (e.g., 40 MHz), the first number of spatial streams (e.g., 1 spatial stream), and the first pre-coding matrix.

Figure 5B:
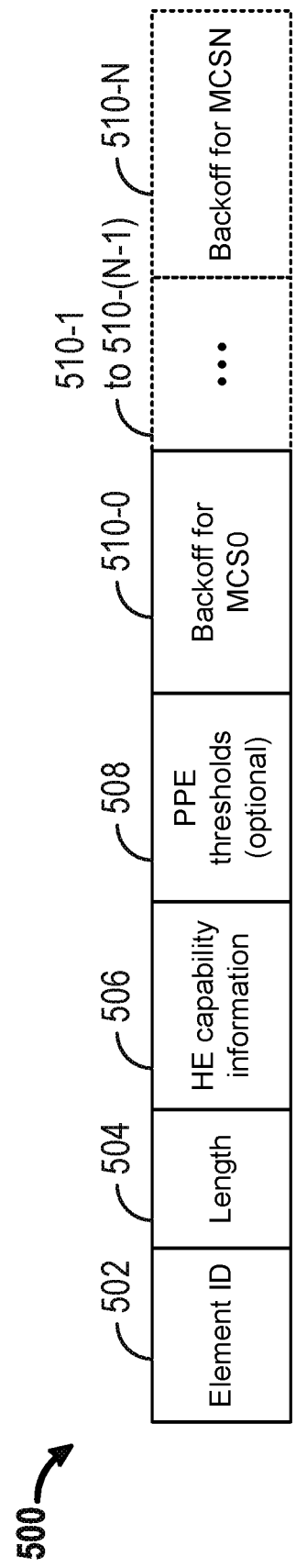
FIG. 5B illustrates an example frame structure in accordance with the techniques described herein.

FIG. 5B illustrates an example frame structure in accordance with the techniques described herein. For example, FIG. 5B illustrates an example frame structure 500 for reporting the power backoff per MCS (which may also be referred to as power backoff per MCS information) from a transmitter to a receiver (e.g., from a STA to an AP). In some examples, the frame structure 500 may be an information element (IE) with a plurality of fields. The IE may be a high efficiency (HE) IE. In some examples, the HE IE may be an HE capability IE. In such examples, the HE capability IE may be named HE Transmit Power Info IE or another name. One or more fields of the plurality of fields may be used to carry or otherwise report transmit power related information (e.g., power backoff per MCS information) to an AP. In some examples, the frame structure 500 may include a one or more fields to carry power backoff per MCS information corresponding to a STA. In some examples, a power backoff per MCS may be represented by a single octet (8 bits). In other examples, a power backoff per MCS may be represented by less than 8 bits or more than 8 bits.

In the example of FIG. 5B, power backoff per MCS fields 510-0 to 510-N (where N is any positive integer) are shown. Each of fields 510-0 to 510-N may be configured to carry or otherwise include power backoff per MCS information. For example, field 510-0 may be configured to carry the power backoff information corresponding to a first MCS (e.g., MCS0) and field 510-N may be configured to carry the Nth power backoff information corresponding to the Nth MCS (e.g., MCSN). Example fields between 510-0 and 510-N are shown by the reference 510-1 to 510-(N−1), where 510-(N−1) represents the field preceding field 510-N. As an example, where N=15, the frame structure may include 16 power backoff per MCS fields. In such an example, field 510-0 may be configured to carry the power backoff information corresponding to a first MCS (e.g., MCS0), field 510-1 may be configured to carry the power backoff information corresponding to a second MCS (e.g., MCS1), field 510-2 may be configured to carry the power backoff information corresponding to a third MCS (e.g., MCS2), and the like.

In some examples, the power backoff per MCS information may be reported via a message. For example, the message may include the frame structure 500 including the power backoff per MCS information. For example, an AP may be configured to transmit the message containing the power backoff per MCS information to a STA. As another example, a STA may be configured to transmit the message containing the power backoff per MCS information an AP. In some examples, certain power backoffs for reference MCSs may be signaled (e.g. transmitted to a receiving device), and one or more power backoffs corresponding to one or more MCSs may be interpolated (e.g., by the receiving device) based on the signaled power backoff information for the reference MCSs. For example, a power backoff of 1 dB for reference MCS3 and a power backoff of 3 dB for reference MCS5 may be signaled and power backoff of 2 dB may be interpolated for MCS4 (which may not be signaled). For example, an MCS component of the receiving device of transmit power related information (e.g., an AP or a STA) may be configured to interpolate one or more power backoffs based on received power backoff per MCS information. In some examples, the Element ID field 502 may indicate the ID of the frame structure 500, the Length field 504 may indicate the length of the frame structure 500, the HE capability information field 506 may indicate features and capabilities of the transmitting node (e.g., STA), and the PPE thresholds field 508 may indicate thresholds used for packet extension computation at a receiver (e.g., an AP).

In some examples, an AP (e.g., AP 104 or AP 202) may notify a STA (e.g., STA 114 or one of STAs 208-212) which IE should be used for sending power backoff per MCS information (e.g., power backoff per MCS information corresponding to the STA). For example, an AP may be configured to notify a STA regarding whether the STA should use frame structure 550 (e.g., an IE in some examples), frame structure 500 (e.g., an HE capability IE in some examples), or some other IE for sending the power backoff per MCS information to the AP. In some examples, an AP (e.g., AP 104) may be configured to notify the STA by broadcasting from the AP via a beacon, a probe, or an association request/response. For example, the beacon, probe, or association request/response may include power backoff per MCS information corresponding to a STA, which may be included in a field (e.g., such as one or more fields 556-0 to 556-N in frame structure 550 or one or more fields 510-0 to 510-N in frame structure 500) in the beacon, probe, association request/response, or a management frame.

In some examples, power backoff per MCS information may be signaled as maximum transmit power per MCS, where maximum transmit power per MCS may be defined as maximum transmit power minus power backoff per MCS. In some examples, power backoff information corresponding to one or more (e.g., all) MCSs may be signaled as an index defined in a standard, such as an 802.11 standard. In other examples, as described herein, one or more power backoffs for reference MCSs may be signaled by a transmitting device (e.g., a STA), and the receiving device (e.g., an AP) may be configured to interpolate one or more power backoffs corresponding to one or more MCSs based on the signaled power backoff information for the reference MCSs. For example, a power backoff of 1 dB for reference MCS3 and a power backoff of 3 dB for reference MCS5 may be signaled and power backoff of 2 dB may be interpolated for MCS4 (which may not be signaled). For example, an MCS component of the receiving device of transmit power related information (e.g., an AP or a STA) may be configured to interpolate one or more power backoffs based on received power backoff per MCS information.

Figure 6A:
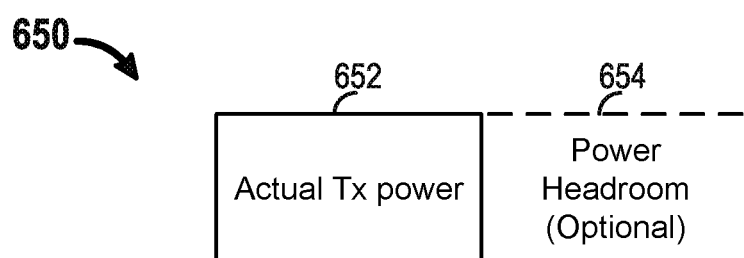
FIG. 6A illustrates an example frame structure in accordance with the techniques described herein.

FIG. 6A illustrates an example frame structure in accordance with the techniques described herein. For example, FIG. 6A illustrates an example frame structure 650 for reporting actual transmit power (which may also be referred to as actual transmit power information) and/or power headroom (which may also be referred to as power headroom information) of a STA from a transmitter to a receiver (e.g., from the STA to an AP). In some examples, the frame structure 650 may be an information element (IE) with one or more fields. The IE may be a high efficiency (HE) IE. In some examples, the HE IE may be an HE capability IE. One or more fields of the plurality of fields may be used to carry or otherwise report transmit power related information (e.g., actual transmit power and/or power headroom of a STA) to an AP. In some examples, the frame structure 650 may include a field, such as field 652 with the example name of "Actual Tx Power," configured to carry the actual transmit power of a STA. For example, the STA may be configured to report (e.g., send or otherwise transmit) the actual transmit power of the STA to an AP via field 652 of the IE. In some examples, the frame structure 650 may include a field, such as field 654 with the example name of "Power Headroom," configured to carry the power headroom of a STA. For example, the STA may be configured to report (e.g., send or otherwise transmit) the power headroom of the STA to an AP via field 654 of the IE. In some examples, the actual transmit power of a STA and/or power headroom of a STA may be reported to the AP via a message from the STA to the AP.

Figure 6B:
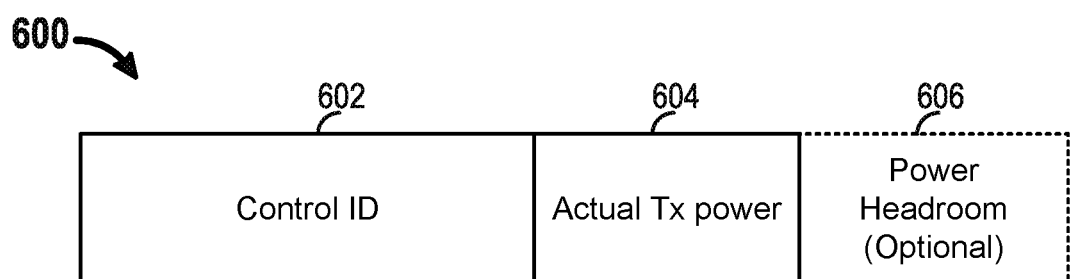
FIG. 6B illustrates an example frame structure in accordance with the techniques described herein.

FIG. 6B illustrates an example frame structure in accordance with the techniques described herein. For example, FIG. 6B illustrates an example frame structure 600 for reporting actual transmit power and/or power headroom of a STA from a transmitter to a receiver (e.g., from the STA to an AP). In some examples, the frame structure 600 may be an information element (IE) with a plurality of fields. The IE may be a high efficiency (HE) IE. In some examples, the HE IE may be an HE control field. In such examples, the HE control field may be named HE Control Field for Tx Power Info or another name. One or more fields of the plurality of fields may be used to carry or otherwise report transmit power related information (e.g., actual transmit power and/or power headroom of a STA) to an AP. In some examples, the frame structure 600 may include a control ID field 602 configured to carry an ID (e.g., a 4-bit ID in some examples) corresponding to the frame structure 600. The frame structure 600 may include a field, such as field 604 with the example name of "Actual Tx Power," configured to carry the actual transmit power of a STA. For example, the STA may be configured to report (e.g., send or otherwise transmit) the actual transmit power of the STA to an AP via field 604 of the HE control field (in some examples, fields 602, 604, and 606 may be considered sub-fields to the HE control field). In some examples, the frame structure 600 may include a field, such as field 606 with the example name of "Power Headroom," configured to carry the power headroom of a STA. For example, the STA may be configured to report (e.g., send or otherwise transmit) the power headroom of the STA to an AP via field 606 of the HE control field. In some examples, the actual transmit power of a STA and/or power headroom of a STA may be reported to the AP via a message from the STA to the AP.

In some examples, reporting of one of either the actual transmit power or the power head room may be enough, and may be carried in an HE-SIG-A field of the preamble (e.g., in the spatial reuse field). For example, the HE-SIG-A field may be carried in a PHY header of HE PPDUs. Additionally, if actual transmit power and/or power head room information is sent in frame structure 600, the actual transmit power and/or power head room information may be transmitted with a corresponding control ID. In some examples, the frame structure 600 may be sent in a MAC header of one or more data frames. In some examples, an IE may be typically sent in dedicated frames, like management or action frames, e.g. probe request/response, association request/response. Therefore, as described herein, bandwidth consumption may be reduced by including transmit power related information in a data frame instead of a dedicated frame.

Although, FIGS. 3A, 3B, 4A, 4B, 5A, 5B, 6A, and 6B illustrate example aspects of reporting various types of transmit power related information, a combination (e.g., one or more) of different types of transmit power related information (e.g., maximum transmit power information, power backoff per MCS information, actual transmit power information, and/or power headroom information) may be reported in one or more frame structures and/or one or more messages transmitted to the AP.

The various frame structures depicted in FIGS. 3A, 3B, 4A, 4B, 5A, 5B, 6A, and 6B may be included or other carried in a MAC header or a physical layer (PHY) header of a frame (e.g., a data frame or a control frame). Otherwise described, any transmit power related information described herein (such as the transmit power related information described with respect to FIGS. 3A, 3B, 4A, 4B, 5A, 5B, 6A, and 6B) may be included or otherwise carried in a MAC header or a physical layer (PHY) header of a frame (e.g., a data frame or a control frame). In some examples, a reduction in bandwidth and an increase in efficiency may be realized by including the transmit power related information in a data frame instead of a control frame because a follow-up frame to the data frame may not be sent to communicate the transmit power related information to the destination device. In other examples, sending transmit power related information from a first device (e.g., a STA) to a second device (e.g., an AP) may enable the second device to increase the goodput of the first device and/or schedule a more efficient consumption of bandwidth. For example, the second device in such examples may be configured to determine the allocated MCS (e.g., allocated data rate) for the first device based on the transmit power related information corresponding to the first device. Otherwise described, by receiving the transmit power related information corresponding to the first device, the second device may be configured to more accurately determine (e.g., select) an uplink (UL) MCS for the first device. In some examples, the second device may be configured to more accurately determine the MCS by being configured to determine an SINR corresponding to the first device based on the transmit power related information received from the first device, thus making the SINR determination more accurate. The second device may be configured to schedule uplink transmissions for multiple first devices (e.g., multiple STAs) in such examples; and, as such, the selection of a respective MCS for each respective first device among the multiple first devices is one example of enabling more efficient bandwidth consumption management.

Figure 7:
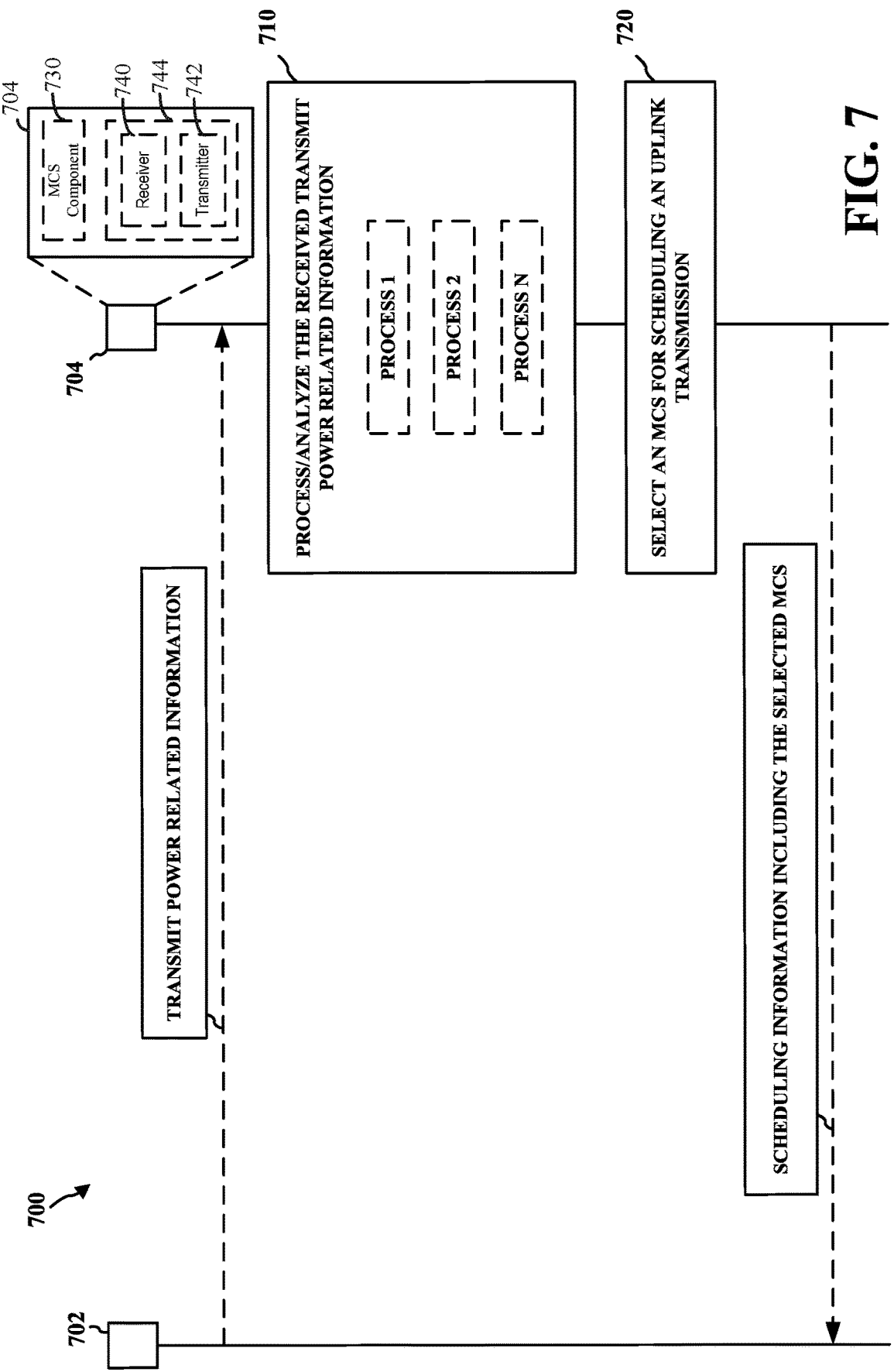
FIG. 7 illustrates an example flow diagram between a first device in communication with a second device in accordance with the techniques described herein.

FIG. 7 illustrates an example flow diagram 700 between a first device 702 (e.g., a STA described herein) in communication with a second device 704 (e.g., an AP described herein) in accordance with the techniques described herein. In other examples, one or more techniques described herein may be added to the flow diagram 700 and/or one or more techniques depicted in the flow diagram may be removed.

In the example of FIG. 7, the first device 702 may be configured to generate a message including transmit power related information corresponding to the first device 702. In some examples, the transmit power related information may include one or more examples of transmit power related information described herein.

For example, the transmit power related information may include power backoff per modulation and coding scheme information. The power backoff per modulation and coding scheme information may include a plurality of power backoffs including a first power backoff corresponding to a first modulation and coding scheme and a second power backoff corresponding to a second modulation and coding scheme. Each power backoff of the plurality of power backoffs may be a function of at least one of: a respective bandwidth or a respective number of spatial streams. As another example, the transmit power related information may include at least one of: a maximum transmit power, power backoff per modulation and coding scheme information, or an actual transmit power.

In some examples, the first device 702 may be configured to generate the message including transmit power related information corresponding to the first device in response to a trigger event. In some examples, the first device 702 may be configured to determine to transmit power related information corresponding to the first device 702. In such examples, the trigger event includes the determination to transmit the transmit power related information. As one example, the first device 702 may be configured to determine to transmit the transmit power related information to the second device 704. In this example, the trigger event includes the determination to transmit the transmit power related information to the second device 704. As another example, the first device 702 may be configured to determine to broadcast the transmit power related information. In this example, the trigger event includes the determination to broadcast the transmit power related information. In some examples, broadcasting information, such as transmit power related information, may refer to the transmission of the information to one or more recipient devices (e.g., any STA, AP, or device described herein). The second device 704 is an example of a recipient device.

In some examples, the first device 702 may be configured to initiate an association procedure with the second device. In such examples, the trigger event includes the initiation of the association procedure with the second device. In some examples, an association procedure may refer to a procedure in which two apparatuses (e.g., the first device 702 and the second device 704) share information about themselves for establishing a connection or the like. In some examples, the first device 702 may be configured to complete an association procedure with the second device 704. In such examples, the trigger event includes the completion of the association procedure with the second device 704. In some examples, the first device 702 may be configured to receive an association procedure request, such as from the second device 704. In such examples, the trigger event includes the reception of the association procedure request. In some examples, the first device 702 may be configured to receive a request for the transmit power related information, such as from the second device 704. In such examples, the trigger event includes the reception of the request for the transmit power related information. In some examples, the second device 704 may be configured to transmit capability information indicative that the second device 704 is capable of processing transmit power related information. For example, the second device 704 may be configured to transmit capability information to the first device 702, where the capability information is indicative that the second device 704 is capable of processing transmit power related information. In some examples, the first device 702 may be configured to receive capability information indicative that the second device 704 is capable of processing transmit power related information. In such examples, the trigger event includes the reception of the capability information. For example, the first device 702 may be configured to receive capability information from the second device 704 indicative that the second device 704 is capable of processing transmit power related information.

The first device 702 may be configured to send transmit power related information to the second device 704. In some examples, the transmit power related information may be sent in a MAC header or a PHY header of a frame (e.g., a data frame). The transmit power related information may include at least one of: maximum transmit power information corresponding to the first device, power backoff per modulation and coding scheme information corresponding to the first device, actual transmit power information corresponding to the first device, or power headroom corresponding to the first device. The second device 704 may be configured to receive the transmit power related information.

At block 710, the second device 704 may be configured to process transmit power related information received from the first device 702 according to the techniques described herein. In some examples, the term process may refer to analyze. For example, the second device 704 may be configured to perform one or more processes using the transmit power related information. The one or more processes are depicted as process 1, process 2, and process N, where process N is a positive integer and represents the Nth process.

At block 720, the second device 720 may be configured to select an MCS for scheduling an uplink transmission with the second device 704 in accordance with the selected MCS. The second device 704 may be configured to send scheduling information including the selected MCS to the first device 702. The first device 702 may be configured to receive the scheduling information including the selected MCS from the second device 704. The first device 702 may be configured to send information in an uplink transmission to the second device 704 in accordance with the selected MCS included in the scheduling information.

In some examples, the second device 704 may be configured to determine a signal to interference plus noise ratio (SINR) for a first MCS based on the transmit power related information (e.g., based on a power backoff corresponding to the first MCS) received from the first device 702. In such examples, this SINR determination may be referred to as process 1 depicted in FIG. 7. In some examples, the SINR may refer to a maximum achievable SINR. In some examples, the second device 704 may be configured to determine a packet error rate corresponding to the first MCS based on the SINR determined from process 1. In such examples, this packet error rate determination may be referred to as process 2. In some examples, the second device 704 may be configured to determine whether the packet error rate determined from process 2 is less than a threshold value. In such examples, this packet error rate determination may be referred to as process 3. In some examples, the threshold may include a percentage within 1% to 20%. For example, the threshold may be 1%, 3%, 10%, 12.5%, 15%, or 20%. In other examples, the threshold value may be less than 1%. In other examples, the threshold value may be less than 30%.

In some examples, the second device 704 may be configured to select, at block 720, the first MCS based on the SINR determined from process 1. In some examples, the second device 704 may be configured to select, at block 720, the first MCS based on the packet error rate determined from process 2. In some examples, the second device 704 may be configured to select, at block 720, the first MCS based on the packet error rate determination from process 3. For example, the second device 704 may be configured to select the first MCS based on the first packet error rate being less than the threshold value.

In some examples, the second device 704 may be configured to determine an SINR for a second MCS based on the transmit power related information (e.g., based on a power backoff corresponding to the second MCS) received from the first device 702. In such examples, this SINR determination may also be referred to as process 1 depicted in FIG. 7. For example, process 1 may be described as being applied to one or more power backoffs, or an SINR determination process. In some examples, the second device 704 may be configured to determine a packet error rate corresponding to the second MCS based on the SINR determined from process 1 corresponding to the second MCS. In such examples, this packet error rate determination may be referred to as process 2 (as applied to the SINR determined for the second MCS). For example, process 2 may be described as a packet error rate determination process. In some examples, the second device 704 may be configured to determine whether the packet error rate determined from process 2 corresponding to the second MCS is less than the threshold value. In such examples, this packet error rate determination may be referred to as process 3 (as applied to the packet error rate determination for the second MCS). For example, process 3 may be described as packet error rate threshold determination process. In some examples, the second device 704 may be configured to compare a first data rate corresponding to the first MCS with a second data rate corresponding to the second MCS when the first packet error rate and the second packet error rate are both determined to be less than the threshold value. In such examples, this comparison may be referred to as process 4.

In some examples, the second device 704 may be configured to select, at block 720, the first MCS based on the comparison result from process 4. For example, the second device 704 may be configured to select, at block 720, the first MCS based on the first data rate corresponding to the first MCS being greater than the second data rate corresponding to the second MCS.

In some examples, an MCS component 730 of the second device 704 may be configured to perform one or more processes described with respect to block 710 and/or one or more processes described with respect to block 720. For example, the MCS component 730 may be configured to perform any processing (e.g., functions, steps, or the like) described herein with respect to transmit power related information. The second device 704 may include a receiver 740 and a transmitter 742. The receiver 740 may be configured to perform any receiving function described herein. For example, the receiver 740 may be configured to receive the transmit power related information sent by the first device 702. For example, the receiver 740 may be configured to receive transmit power related information sent by a transmitter of the first device. The transmitter 742 may be configured to perform any transmitting function described herein. For example, the transmitter 742 may be configured to send scheduling information including a selected MCS to the first device. The first device may include a receiver configured to receive the scheduling information. The receiver 740 and the transmitter 742 may be combined into a transceiver 744.

Figure 8:
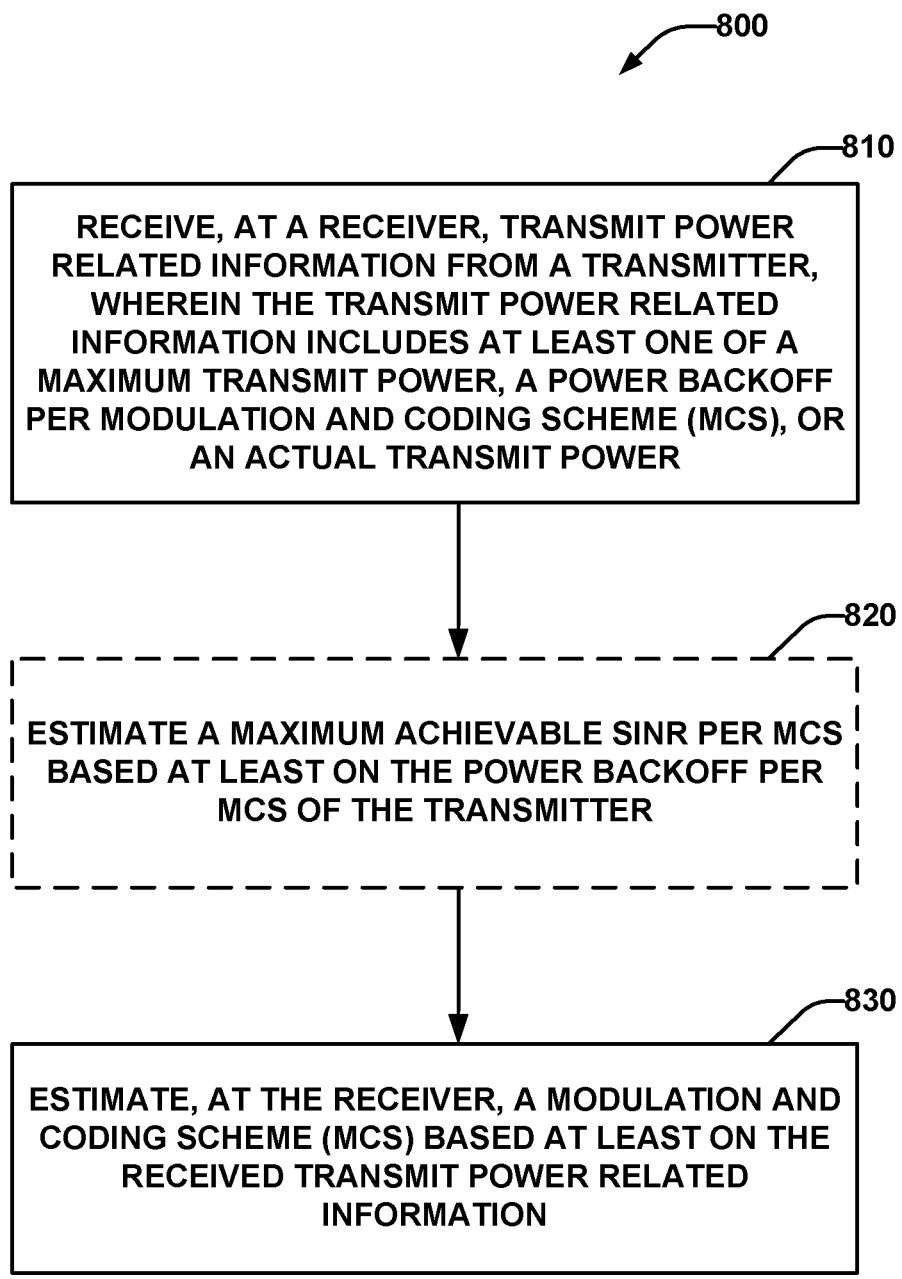
FIG. 8 is a flowchart of an example method of wireless communication in accordance with the techniques described herein.

FIG. 8 is a flowchart of an example method of wireless communication in accordance with the techniques described herein. The method 800 may be performed using a first apparatus (e.g., any STA, AP, or device described herein).

At block 810, a receiver of the first apparatus may be configured to receive transmit power related information from a transmitter of, for example, a second apparatus (e.g., any STA, AP, or device described herein). In some examples, the transmit power related information may include at least one of a maximum transmit power, a power backoff per modulation and coding scheme (MCS), or an actual transmit power. The receiver of the first apparatus may be configured to store received transmit power related information in a memory accessible by the first apparatus (e.g., a memory of the first apparatus). Although the transmit power related information may include maximum transmit power information, power backoff per MCS information, and/or actual transmit power information, not all have to be reported by the second apparatus. In some examples, any combination of maximum transmit power information, power backoff per MCS information, and/or actual transmit power information may be reported by the second apparatus and received by the first apparatus.

In some examples, transmit power related information may be sent by the transmitter of the second apparatus in, for example, a management frame (such as an association request during an association procedure) or in an HE control field in a MAC header of a data frame. In some examples, the second apparatus may be configured to not receive a trigger frame (TF) prior to transmitting the transmit power related information to the first apparatus. For example, receipt of a TF at the second apparatus prior to transmitting of the transmit power related information to the first apparatus may be optional. In other examples, the first apparatus may be configured to send a trigger frame (e.g., trigger frame 216) to the second apparatus. The first apparatus may be configured to broadcast the trigger frame to the second apparatus for triggering or initiating a MU-MIMO communication on the UL from second apparatus to the first apparatus. For example, receipt of the trigger frame by the second apparatus may trigger or initiate MU-MIMO configuration at the second apparatus for one or more UL transmissions to the first apparatus. In some examples, the trigger frame may include scheduling information, resource allocations, and an assigned or allocated rate (e.g., a data rate for uplink transmission) for the second apparatus.

At block 820, the first apparatus may be configured to estimate a maximum achievable SINR per MCS based at least on the power backoff per MCS of the transmitter. In some examples, the first apparatus may include an MCS component. As used herein, any component (including but not limited to an MCS component) may, for example, be a specially programmed processor module configured to perform any functions, steps, or the like described in relation thereto; or a processor configured to execute code stored in a memory that, when executed, cause the processor to perform any functions, steps, or the like described in relation thereto. For example, the MCS component of the first apparatus may be configured to estimate a maximum achievable SINR per MCS based at least on the power backoff per MCS of the transmitter.

At block 830, the first apparatus may be configured to estimate an MCS based at least on the received transmit power related information. For example, the MCS component of the first apparatus may be configured to estimate an MCS for an uplink transmission of the second apparatus based at least on the received transmit power related information.

In some examples, when the transmit power related information received includes the maximum transmit power of the transmitter of the second apparatus, the first apparatus may be configured to estimate the maximum achievable SINR of the transmitter of the second apparatus as SINR of a current frame+(maximum transmit power−current transmit power). In some examples, when the transmit power related information received includes power backoff per MCS information, the first apparatus may be configured to estimate the maximum achievable SINR per MCS by subtracting the power backoff per MCS from maximum transmit power. Based on maximum achievable SINR per MCS, the first apparatus may be configure to determine the best possible (e.g., highest, second highest, etc.) MCS to maximize goodput, which may be defined as: (the data rate corresponding to the MCS) multiplied by (1 minus the packet error rate corresponding to the MCS at the maximum achievable SINR determined for the MCS). In some examples, when the transmit power related information received includes the actual power of the transmitter, the first apparatus may be configured to estimate path loss to the transmitter by actual transmit power minus receiver signal strength indication (RSSI) received from the transmitter of the second device. In examples where the transmit power related information received includes the power headroom, the first apparatus may be configured to estimate a maximum achievable SINR per MCS by adding power headroom to a current SINR for that MCS. In some examples, the current SINR for an MCS may refer to the current received signal strength indicator (SSI) for the MCS divided by total interference plus noise power, which may be described as: received SSI/(total interference+noise power).

In some examples, the first apparatus may be configured to receive the transmit power related information from the second apparatus in the respective resource allocated to the second apparatus by the first apparatus. Additionally, the goodput of the second apparatus may be improved if the first apparatus determines the allocated rate (which may be referred to as a selected MCS) for the second apparatus based at least on the latest channel state and interference level values at the second apparatus as the latest values allow the first apparatus to more accurately estimate the latest SINR at the second apparatus and determine the UL MCS for the second apparatus. The latest channel state information and the interference level values are two examples of information that may be used in conjunction with the transmit power related information. In an example, the first apparatus may be configured to estimate the latest SINR and use the estimated SINR to predict (e.g., select) the MCS for the second apparatus.

In some examples, the transmit power related information received at the first apparatus from the second apparatus may include a maximum transmit power, a power backoff per MCS, or an actual transmit power (or power headroom). The second apparatus may be configured to send the transmit power related information in a resource allocated by the first apparatus. For example, the second apparatus may have a dedicated resource allocated to it by the first apparatus. In some examples, the second apparatus may be configured to send its transmit power related information in the resource allocated to the second apparatus by the first apparatus. In some examples, the first apparatus may be configured to estimate UL SINRs and estimate (e.g., predict or otherwise select) an MCS for the second apparatus to use in UL transmissions to the first apparatus based at least on the transmit power related information received from the second apparatus. The first apparatus may be configured to receive the transmit power related information corresponding to the second apparatus via one or more frame structures, such as the one or more frame structures described with respect to FIGS. 3A, 3B, 4A, 4B, 5A, 5B, 6A, and 6B herein.

In some examples, the first apparatus may be configured to estimate the maximum achievable SINR for the second apparatus based at least on the maximum transmit power information sent by the second apparatus. For example, the second apparatus may be configured to determine the maximum transmit power based on the maximum output power at an antenna port of the second apparatus.

As described herein, power backoff per MCS information may refer to a transmit power backoff from a maximum transmit power to prevent the power amplifier (PA) of a transmitter from entering a non-linear state. For example, power backoff per MCS information for a STA may refer to a transmit power backoff from a maximum transmit power of a transmitter of the STA to prevent the transmitter (e.g., the power amplifier (PA) of the transmitter) of the STA from entering a non-linear state. As an example, if the transmit power of a STA increases from 20 dB to 30 dB, the increase in the transmit power may cause the PA of the transmitter to enter a non-linear region of operation which may distort the signal. Therefore, in some examples, a STA may use a power backoff per MCS to limit the actual transmit power and report the power backoff per MCS to an AP. In an aspect, the power backoff per MCS may be configured in the firmware of the STA and may be reported for each MCS index value. In some examples, an AP may use the power backoff per MCS to estimate a maximum SINR per MCS and therefore determine the best (e.g., highest possible, second highest, third highest, etc.) MCS for the STA. For example, in an example, the best MCS (e.g., for a UL transmission from the STA to the AP) may be defined as the highest MCS (or highest MCS index/MCS index value) with a packet error rate (PER) below a threshold at the estimated SINR for this MCS. In some examples, the backoff per MCS may be a function of bandwidth (e.g., channel bandwidth), number of spatial streams, and/or pre-coding matrix. For a given MCS, a power backoff may be different for different bandwidths (e.g., a 3 dB power backoff for a 40 MHz channel, a 6 dB power backoff for a 80 MHz channel), and/or different streams with the given MCS (e.g., a 3 dB power backoff for 1 stream, or a 6 dB backoff for 2 streams, etc.).

In some examples, actual transmit power may be defined as actual transmit power of a transmitted frame. An AP may be configured to use the actual transmit power of a transmitted frame to estimate the path loss during transmission of the frame from the STA to the AP. Power headroom for a transmitted frame may, in some examples, be defined as reference transmit power minus actual transmit power. The reference transmit power may be a maximum transmit power, or maximum transmit power minus power backoff. However, because the maximum transmit power may be derived by adding the actual transmit power and the power headroom, not all of maximum transmit power, actual transmit power, and power headroom values may be included in transmit power related information sent by, for example, a STA to an AP. For example, less than all of power headroom, maximum transmit power, and actual transmit power may be signaled.

Figure 9:
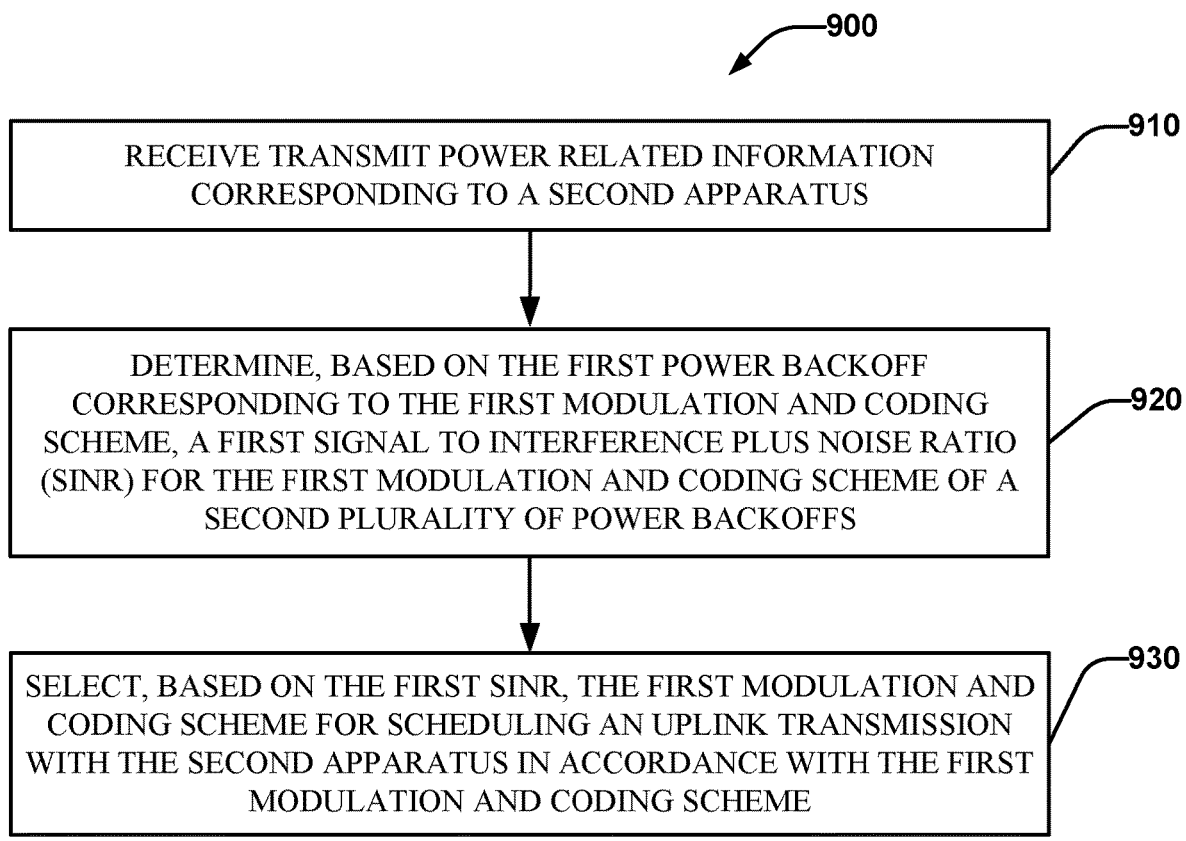
FIG. 9 is a flowchart of an example method of wireless communication in accordance with the techniques described herein.

FIG. 9 is a flowchart of an example method of wireless communication in accordance with the techniques described herein. The method 900 may be performed using a first apparatus (e.g., any STA, AP, or device described herein).

At block 910, the first apparatus may be configured to receive transmit power related information corresponding to a second apparatus (e.g., any STA, AP, or device described herein). The transmit power related information may include power backoff per modulation and coding scheme information. The power backoff per modulation and coding scheme information may include a first plurality of power backoffs including a first power backoff corresponding to a first modulation and coding scheme and a second power backoff corresponding to a second modulation and coding scheme. Each power backoff of the first plurality of power backoffs may be a function of at least one of: a respective bandwidth or a respective number of spatial streams. In some examples, the first apparatus may be configured to store the transmit power related information in a memory accessible by the first apparatus (e.g., a memory of the first apparatus).

At block 920, the first apparatus may be configured to determine, based on the first power backoff corresponding to the first modulation and coding scheme, a first SINR for the first modulation and coding scheme of a second plurality of power backoffs. In some examples, the SINR may include a maximum achievable SINR. The second plurality of power backoffs may be a subset of the first plurality of power backoffs. Each power backoff of the second plurality of power backoffs may be a function of a first bandwidth or a first number of spatial streams. For example, if each power backoff of the second plurality of power backoffs is a function of the first bandwidth, then the first bandwidth is the respective bandwidth for each power backoff of the second plurality of power backoffs. As another example, if each power backoff of the second plurality of power backoffs is a function of the first number of spatial streams, then the first number of spatial streams is the respective number of spatial streams for each power backoff of the second plurality of power backoffs. In some examples, each power backoff of the first plurality of power backoffs may be a function of a respective precoding matrix. In some examples, each power backoff of the second plurality of power backoffs may be a function of a first precoding matrix. For example, if each power backoff of the second plurality of power backoffs is a function of the first precoding matrix, then the first pre-coding matrix is the respective precoding matrix for each power backoff of the second plurality of power backoffs. In some examples, the first apparatus may be an AP and the second apparatus may be a STA. In other examples, the first apparatus may be a STA and the second apparatus may be a AP.

At block 930, the first apparatus may be configured to select, based on the first SINR, the first modulation and coding scheme for scheduling an uplink transmission with the second apparatus in accordance with the first modulation and coding scheme.

In some examples, the first apparatus may be configured to determine, based on the first SINR, a first packet error rate corresponding to the first modulation and coding scheme. In such examples, the first apparatus may be configured to select the first modulation and coding scheme based on the first SINR by being configured to select the first modulation and coding scheme based on the first packet error rate. In some examples, the first apparatus may be configured to determine whether the first packet error rate is less than a threshold value. In such examples, the first apparatus may be configured to select the first modulation and coding scheme based on the first SINR by being configured to select the first modulation and coding scheme based on the first packet error rate being less than the threshold value. The threshold value may include a percentage within 1% to 20%. For example, the threshold may be 1%, 3%, 10%, 12.5%, 15%, or 20%. In other examples, the threshold value may be less than 1%. In other examples, the threshold value may be less than 30%.

In some examples, the first apparatus may be configured to determine, based on the second power backoff corresponding to the second modulation and coding scheme, a second SINR for the second modulation and coding scheme of the second plurality of power backoffs. The first apparatus may be configured to determine, based on the second SINR, a second packet error rate corresponding to the second modulation and coding scheme. The first apparatus may be configured to determine whether the second packet error rate is less than the threshold value. In some examples, the first apparatus may be configured to select the first modulation and coding scheme based on the first SINR by being configured to select the first modulation and coding scheme based on the first modulation and coding scheme having a first data rate greater than a second data rate of the second modulation and coding scheme. In some examples, the first apparatus may be configured to compare a first data rate corresponding to the first modulation and coding scheme with a second data rate corresponding to the second modulation and coding scheme when the first packet error rate and the second packet error rate are both determined to be less than the threshold value. In such examples, the first apparatus may be configured to select the first modulation and coding scheme based on the first SINR by being configured to select the first modulation and coding scheme based on the first data rate being greater than the second data rate.

In some examples, the first apparatus may be configured to receive the power backoff per modulation and coding scheme information in a high efficiency (HE) capability information element (IE) of a frame. The frame may be a data frame or an HE control frame. The first apparatus may be configured to receive the power backoff per modulation and coding scheme information in a Medium Access Control (MAC) header or a physical layer (PHY) header of a data frame. In some examples, a message may be a frame or a data frame.

Figure 10:
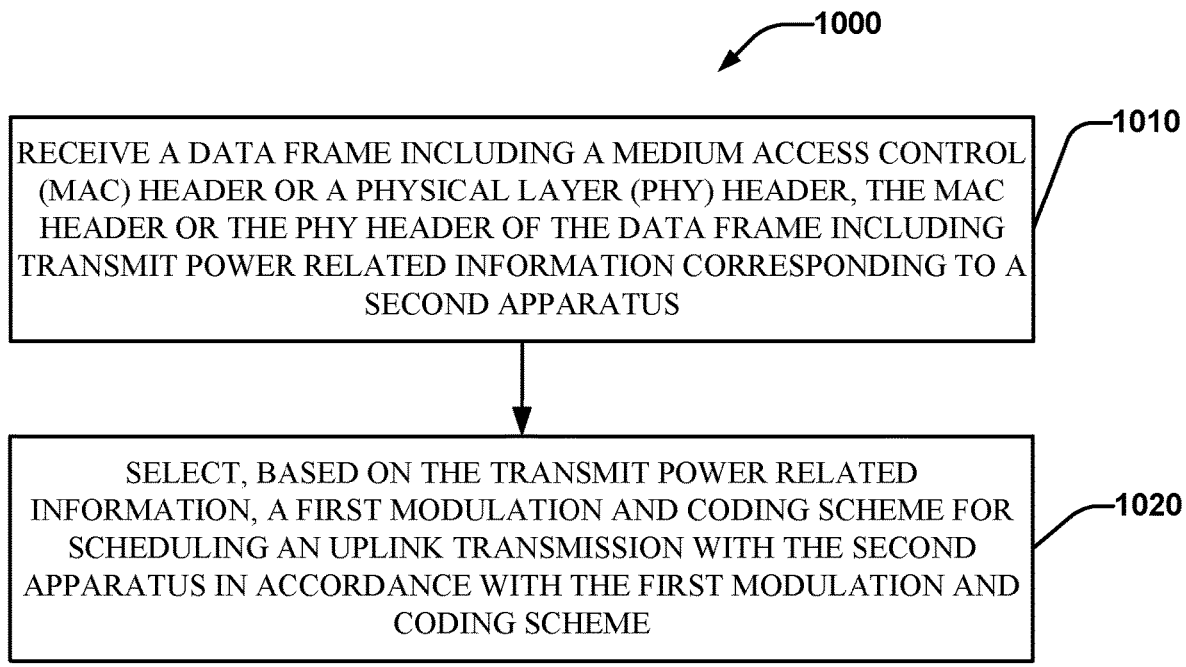
FIG. 10 is a flowchart of an example method of wireless communication in accordance with the techniques described herein.

FIG. 10 is a flowchart of an example method of wireless communication in accordance with the techniques described herein. The method 1000 may be performed using a first apparatus (e.g., any STA, AP, or device described herein).

At block 1010, the first apparatus may be configured to receive a data frame including a Medium Access Control (MAC) header or a physical layer (PHY) header. The MAC header or the PHY header of the data frame may include transmit power related information corresponding to a second apparatus. In some examples, a message may be a frame or a data frame. Similarly, a frame or a data frame may be a message, provided that the message includes data if the message is a data frame. The transmit power related information may include at least one of: a maximum transmit power, power backoff per modulation and coding scheme information, or an actual transmit power. In some examples, the first apparatus may be configured to store the transmit power related information in a memory accessible by the first apparatus (e.g., a memory of the first apparatus). In some examples, the first apparatus may be an AP and the second apparatus may be a STA. In other examples, the first apparatus may be a STA and the second apparatus may be a AP.

At block 1020, the first apparatus may be configured to select, based on the transmit power related information, a first modulation and coding scheme for scheduling an uplink transmission with the second apparatus in accordance with the first modulation and coding scheme.

In some examples, the first apparatus may be configured to determine, based on the transmit power related information, a first SINR for the first modulation and coding scheme. In such examples, the first apparatus may be configured to select the first modulation and coding scheme based on the transmit power related information by being configured to select the first modulation and coding scheme based on the on the first SINR. In some examples, the SINR may include a maximum achievable SINR. In some examples, the first apparatus may be configured to determine, based on the first SINR, a first packet error rate corresponding to the first modulation and coding scheme. In such examples, the first apparatus may be configured to select the first modulation and coding scheme based on the first SINR by being configured to select the first modulation and coding scheme based on the first packet error rate. In some examples, the first apparatus may be configured to determine whether the first packet error rate is less than a threshold value. In such examples, the first apparatus may be configured to select the first modulation and coding scheme based on the first packet error rate by being configured to select the first modulation and coding scheme based on the first packet error rate being less than the threshold value. The threshold value may include a percentage within 1% to 20%. For example, the threshold may be 1%, 3%, 10%, 12.5%, 15%, or 20%. In other examples, the threshold value may be less than 1%. In other examples, the threshold value may be less than 30%.

In some examples, the maximum transmit power may correspond to a maximum output power at an antenna port of a transmitter of the second apparatus. The MAC header or the PHY header of the data frame may include a high efficiency (HE) capability information element (IE) that includes the transmit power related information. The MAC header or the PHY header of the data frame may include a high efficiency (HE) control field that includes the transmit power related information. The MAC header or the PHY header of the data frame may include a high efficiency-signal-A (HE-SIG-A) field that includes the transmit power related information.

Figure 11:
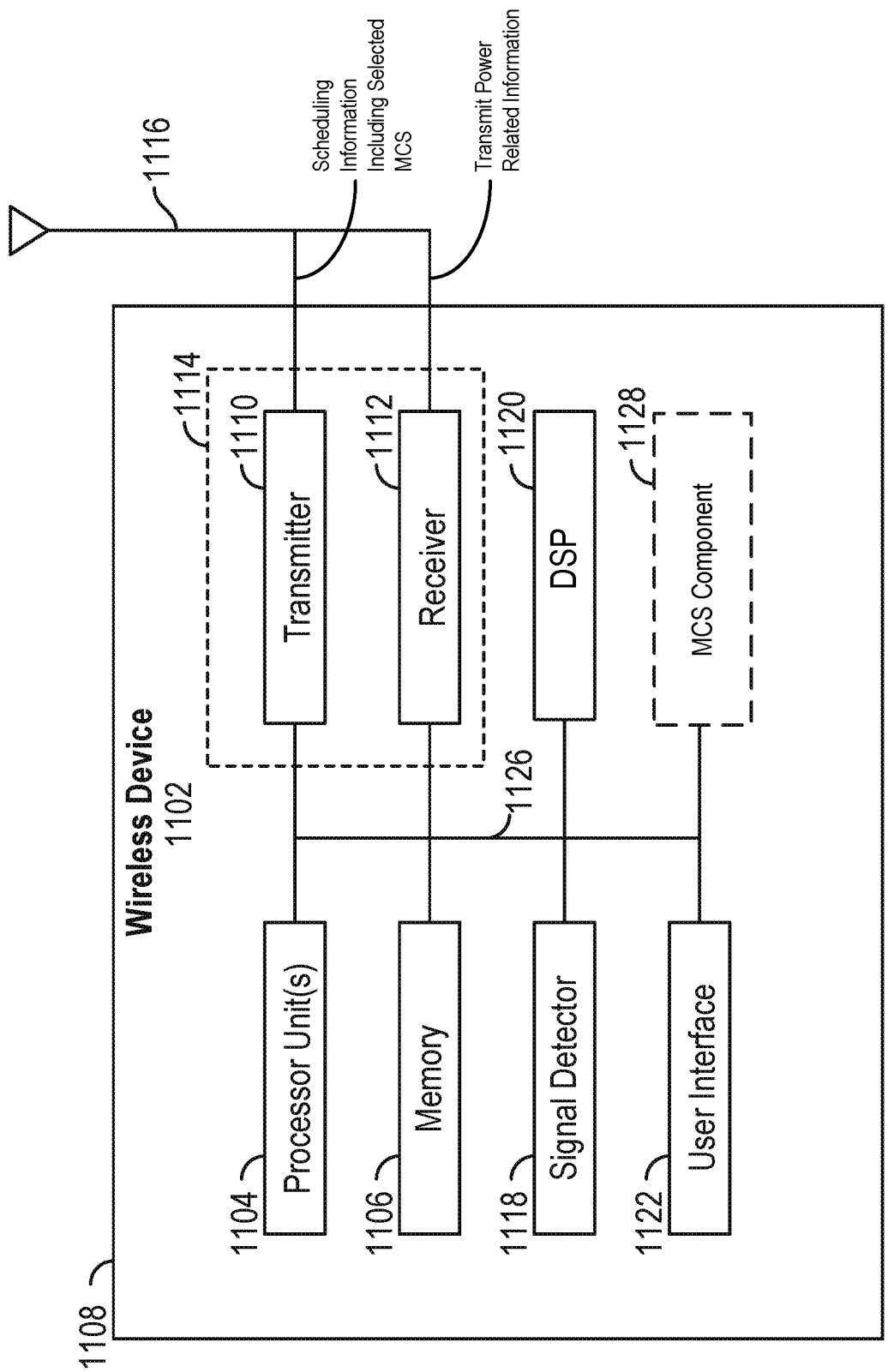
FIG. 11 is a functional block diagram of an example wireless communication device configured in accordance with the techniques described herein.

FIG. 11 is a functional block diagram of an example wireless communication device 1102 configured in accordance with the techniques described herein. The wireless device 1102 is an example of a device that may be configured to implement various techniques described herein. For example, the wireless device 1102 may be an AP or a STA described herein.

The wireless device 1102 may include a processor 1104 configured to control the operation of the wireless device 1102. The processor 1104 may, in some examples, be referred to as a central processing unit (CPU). Memory 1106 may include both read-only memory (ROM) and random access memory (RAM). The processor 1104 may be configured to receive instructions and data from the memory 1106. A portion of the memory 1106 may also include non-volatile random access memory (NVRAM). The processor 1104 may be configured to perform logical and arithmetic operations based on program instructions stored in the memory 1106. The instructions in the memory 1106 may be executable (by the processor 1104, for example) to implement the techniques described herein.

The processor 1104 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 1102 may also include a housing 1108, and the wireless device 1102 may include a transmitter 1110 and/or a receiver 1112 to allow transmission and/or reception of information between the wireless device 1102 and a another device. The transmitter 1110 and the receiver 1112 may be combined into a transceiver 1114. An antenna 1116 may be attached to the housing 1108 and electrically coupled to the transceiver 1114. The wireless device 1102 may also include multiple transmitters, multiple receivers, multiple transceivers, and/or multiple antennas.

The wireless device 1102 may also include a signal detector 1118 that may be configured to detect and quantify the level of signals received by the transceiver 1114 or the receiver 1112. The signal detector 1118 may be configured to detect such signals and be configured to measure signal metrics such as total energy, energy per subcarrier per symbol, power spectral density, and other signal metrics. The wireless device 1102 may also include a digital signal processor (DSP) 1120 for use in processing signals. The DSP 1120 may be configured to generate a packet for transmission. In some aspects, the packet may comprise a physical layer convergence procedure (PLCP) protocol data unit (PPDU).

The wireless device 1102 may further comprise a user interface 1122 in some examples. The user interface 1122 may comprise a keypad, a microphone, a speaker, and/or a display. The user interface 1122 may include any element or component configured to convey information to a user of the wireless device 1102 and/or configured to receive input from the user. The wireless device 1102 may also include an MCS component 1128. In some examples, the MCS component 1128 may be a component of the processor 1104. The MCS component 1128 may be configured to perform any processing (e.g., functions, steps, or the like) described herein with respect to transmit power related information.

For example, the MCS component 1128 may be configured to receive (e.g., from the receiver 1112) transmit power related information corresponding to a second apparatus (e.g., any device described herein, such as a STA or AP). The MCS component 1128 may be configured to determine, based on the a power backoff corresponding to a first modulation and coding scheme, a first SINR for the first modulation and coding scheme of a second plurality of power backoffs. The MCS component 1128 may be configured to select, based on the first SINR, the first modulation and coding scheme for scheduling an uplink transmission with the second apparatus in accordance with the first modulation and coding scheme. The MCS component 1128 may be configured to generate scheduling information including the selected MCS. The MCS component 1128 may be configured to send the scheduling information to the transmitter 1110. The transmitter 1110 may be configured to transmit the scheduling information.

As another example, the MCS component 1528 may be configured to receive (e.g., from the receiver 1112) a data frame including a Medium Access Control (MAC) header or a physical layer (PHY) header. The MAC header or the PHY header of the data frame may include transmit power related information corresponding to a second apparatus (e.g., any device described herein, such as a STA or AP). The MCS component 1128 may be configured to select, based on the transmit power related information, a first modulation and coding scheme for scheduling an uplink transmission with the second apparatus in accordance with the first modulation and coding scheme. The MCS component 1128 may be configured to generate scheduling information including the selected MCS. The MCS component 1128 may be configured to send the scheduling information to the transmitter 1110. The transmitter 1110 may be configured to transmit the scheduling information.

The various components of the wireless device 1102 may be coupled together by a bus system 1126. The bus system 1126 may include a data bus, for example, as well as a power bus, a control signal bus, and a status signal bus in addition to the data bus. Components of the wireless device 1102 may be coupled together or accept or provide information to each other using some other mechanism.

Although a number of separate components are illustrated in FIG. 11, one or more of the components may be combined or commonly implemented. For example, the processor 1104 may be used to implement not only the functionality described above with respect to the processor 1104, but also to implement the functionality described above with respect to the signal detector 1118, the DSP 1120, the user interface 1122, and/or the MCS component 1128. Further, each of the components illustrated in FIG. 11 may be implemented using a plurality of separate elements.

Figure 12:
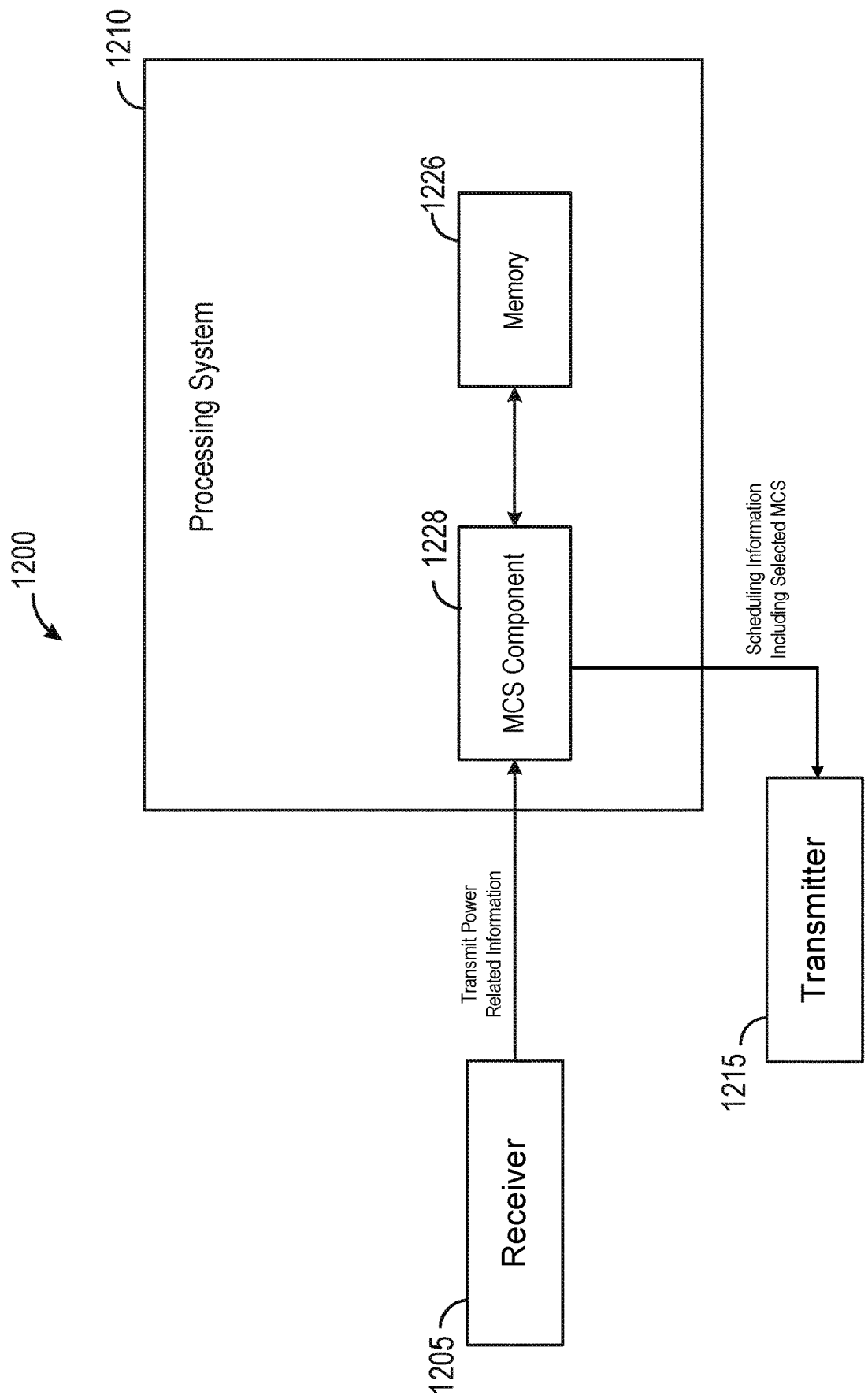
FIG. 12 is a functional block diagram of an example wireless communication device configured in accordance with the techniques described herein.

FIG. 12 is a functional block diagram of an example wireless communication device 1200 configured in accordance with the techniques described herein. The wireless device 1200 is an example of a device that may be configured to implement various techniques described herein. For example, the wireless device 1200 may be an AP or a STA described herein. The wireless communication device 1200 may be configured to receive or send transmit power related information. The wireless communication device 1200 may include a receiver 1205, a processing system 1210, and a transmitter 1215. The processing system 1210 may include an MCS component 1228 and/or a memory 1226. The receiver 1205, the processing system 1210, the transmitter 1215, the memory 1226, and/or the MCS component 1228 may be configured to perform one or more techniques described herein. For example, the receiver 1205, the processing system 1210, the transmitter 1215, the memory 1226, and/or the MCS component 1228 may be configured to perform one or more techniques described with respect to an AP or STA of FIG. 1, an AP or STA of FIG. 2, the first device or second device of FIG. 7, the first apparatus configured to perform the method described with respect to FIG. 8, the first apparatus configured to perform the method described with respect to FIG. 9, the first apparatus configured to perform the method described with respect to FIG. 10, or the wireless device of FIG. 11. For example, the receiver 1205 may be configured to perform any receiving function. As another example, transmitter 1215 may be configured to perform any transmitting function. As another example, the MCS component 1228 may be configured to process transmit power related information. As another example, the MCS component 1228 may be configured to generate scheduling information including a selected MCS based on the processing of the transmit power related information.

In some examples, the receiver 1205 may correspond to the receiver 1112. The processing system 1210 may correspond to the processor 1104. The transmitter 1215 may correspond to the transmitter 1110. The MCS component 1228 may correspond to the MCS component 1128.

In some examples, the wireless communication device 1200 may include means for performing the functions described herein. For example, means for performing the functions described herein may include one or more of the receiver 1205, the processing system 1210, the MCS component 1228, the memory 1226, and/or the transmitter 1215.

Figure 13:
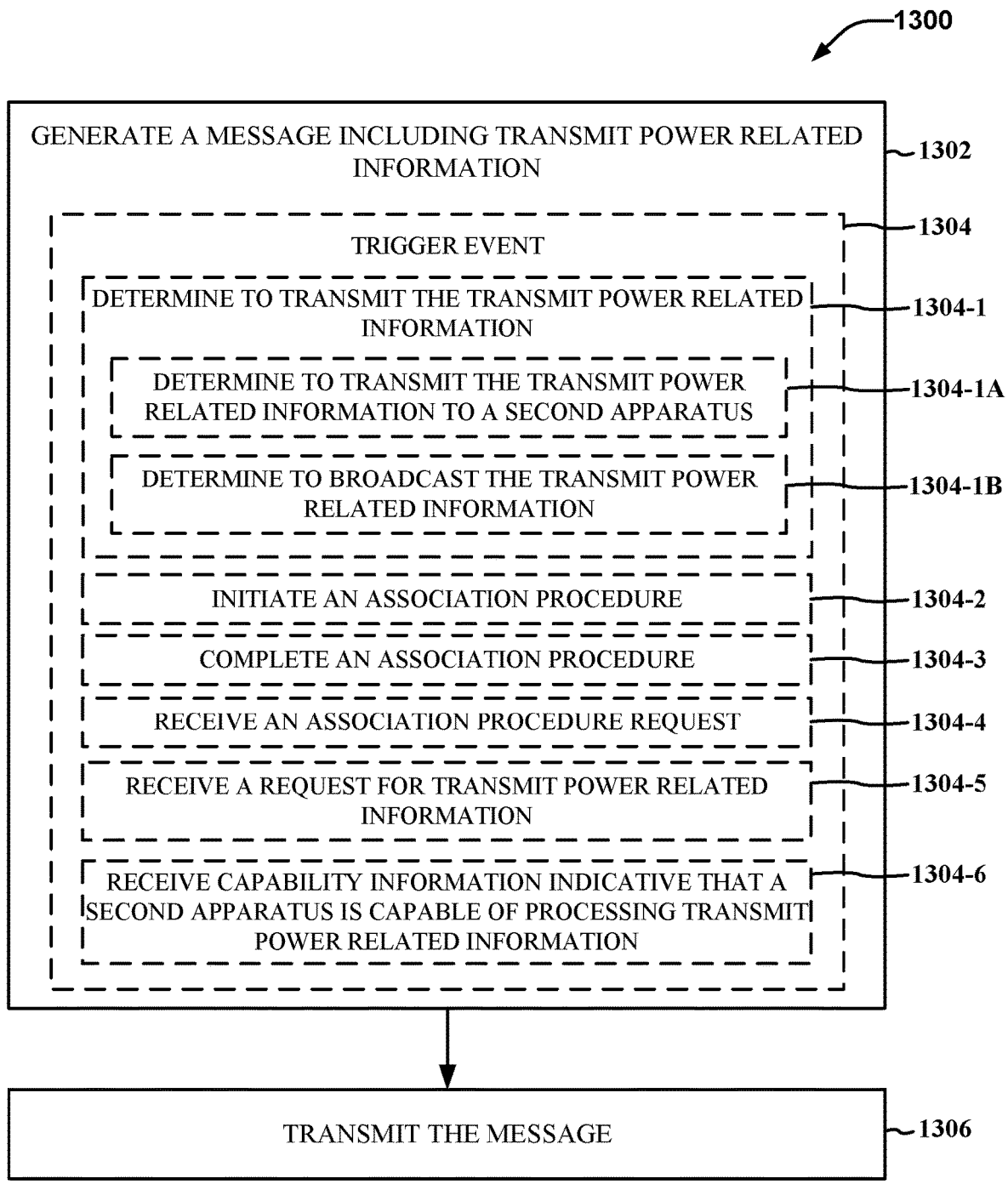
FIG. 13 is a flowchart of an example method of wireless communication in accordance with the techniques described herein.

FIG. 13 is a flowchart of an example method of wireless communication in accordance with the techniques described herein. The method 1300 may be performed using a first apparatus (e.g., any STA, AP, or device described herein).

At block 1302, the first apparatus may be configured to generate a message including transmit power related information corresponding to the first apparatus. The transmit power related information may include power backoff per modulation and coding scheme information. The power backoff per modulation and coding scheme information may include a plurality of power backoffs including a first power backoff corresponding to a first modulation and coding scheme and a second power backoff corresponding to a second modulation and coding scheme. Each power backoff of the plurality of power backoffs may be a function of at least one of: a respective bandwidth or a respective number of spatial streams.

At block 1306, the first apparatus may be configured to transmit the message to a second apparatus (e.g., any STA, AP, or device described herein). In some examples, the first apparatus may be an AP and the second apparatus may be a STA. In other examples, the first apparatus may be a STA and the second apparatus may be a AP.

In some examples, the first apparatus may be configured to generate the message including transmit power related information corresponding to the first apparatus in response to a trigger event, as depicted by block 1304. Blocks 1304-1 through 1304-6 provide various examples of trigger events that may cause the first apparatus to generate the message including transmit power related information corresponding to the first apparatus. For example, at block 1304-1, the first apparatus may be configured to determine to transmit the transmit power related information. In this example, the trigger event includes the determination to transmit the transmit power related information. Blocks 1304-1A and 1304-1B provide two examples of block 1304-1.

For example, at block 1304-1A, the first apparatus may be configured to determine to transmit the transmit power related information to the second apparatus (e.g., any STA, AP, or device described herein). In this example, the trigger event includes the determination to transmit the transmit power related information to the second apparatus. As another example, at block 1304-1B, the first apparatus may be configured to determine to broadcast the transmit power related information. In this example, the trigger event includes the determination to broadcast the transmit power related information. In some examples, broadcasting information, such as transmit power related information, may refer to the transmission of the information to one or more recipient devices (e.g., any STA, AP, or device described herein).

As another example, at block 1304-2, the first apparatus may be configured to initiate an association procedure with the second device. In this example, the trigger event includes the initiation of the association procedure with the second device. In some examples, an association procedure may refer to a procedure in which two apparatuses (e.g., the first apparatus and the second apparatus) share information about themselves for establishing a connection or the like. As another example, at block 1304-3, the first apparatus may be configured to complete an association procedure with the second apparatus. In this example, the trigger event includes the completion of the association procedure with the second apparatus. As another example, at block 1304-4, the first apparatus may be configured to receive an association procedure request, such as from the second apparatus. In this example, the trigger event includes the reception of the association procedure request.

As another example, at block 1304-5, the first apparatus may be configured to receive a request for the transmit power related information, such as from the second apparatus. In this example, the trigger event includes the reception of the request for the transmit power related information. As another example, at block 1304-6, the first apparatus may be configured to capability information indicative that the second apparatus is capable of processing transmit power related information. In this example, the trigger event includes the reception of the capability information.

In some examples, the first apparatus may be configured to receive the power backoff per modulation and coding scheme information in a high efficiency (HE) capability information element (IE) of a frame. The frame may be a data frame or an HE control frame. The first apparatus may be configured to receive the power backoff per modulation and coding scheme information in a Medium Access Control (MAC) header or a physical layer (PHY) header of a data frame. In some examples, a message may be a frame or a data frame. Similarly, a frame or a data frame may be a message, provided that the message includes data if the message is a data frame.

Figure 14:
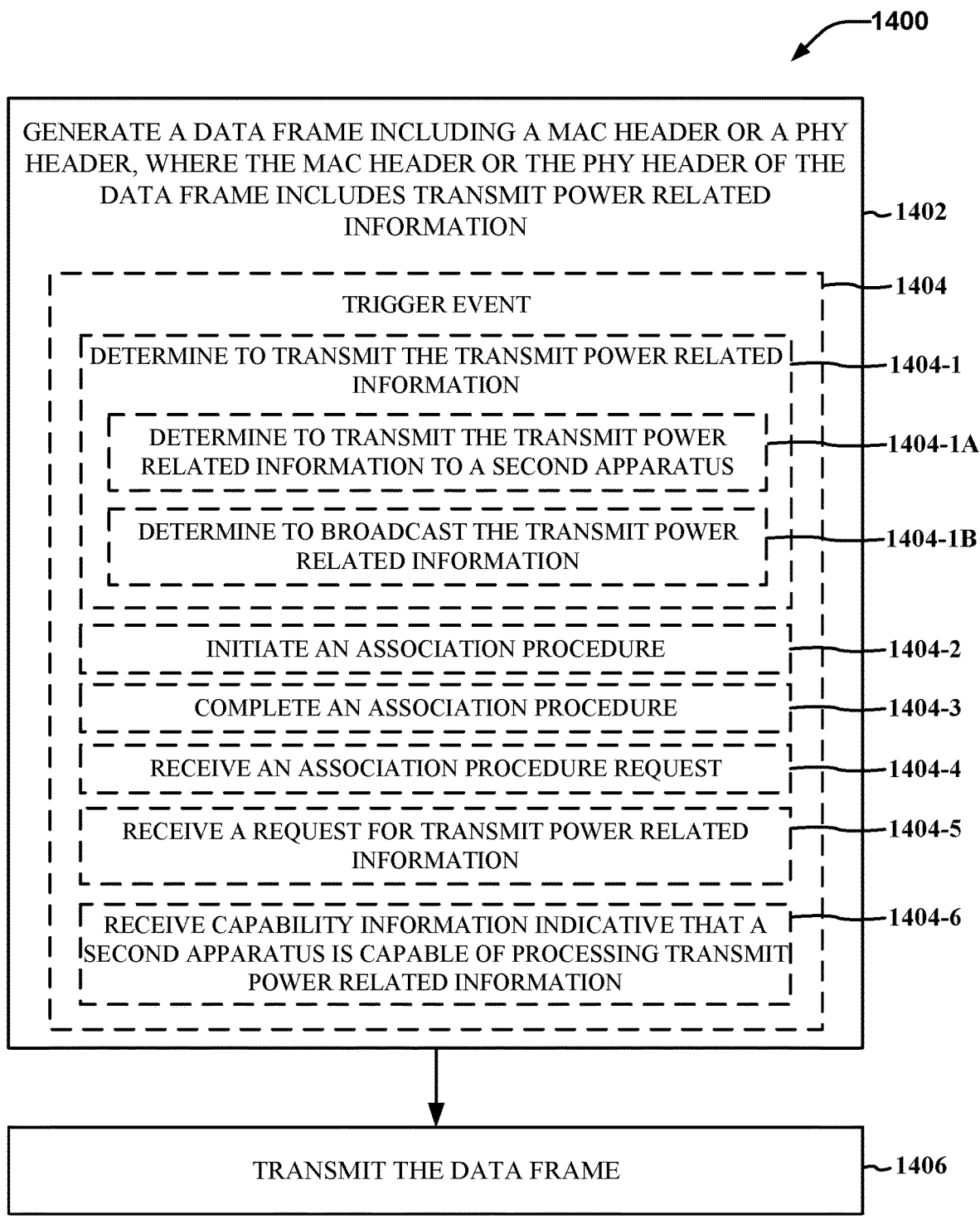
FIG. 14 is a flowchart of an example method of wireless communication in accordance with the techniques described herein.

FIG. 14 is a flowchart of an example method of wireless communication in accordance with the techniques described herein. The method 1400 may be performed using a first apparatus (e.g., any STA, AP, or device described herein).

At block 1402, the first apparatus may be configured to generate a data frame including a Medium Access Control (MAC) header or a physical layer (PHY) header. The MAC header or the PHY header of the data frame may include transmit power related information corresponding to a first apparatus. In some examples, a message may be a frame or a data frame. Similarly, a frame or a data frame may be a message, provided that the message includes data if the message is a data frame. The transmit power related information may include at least one of: a maximum transmit power, power backoff per modulation and coding scheme information, or an actual transmit power.

In some examples, the maximum transmit power may correspond to a maximum output power at an antenna port of a transmitter of the first apparatus. The MAC header or the PHY header of the data frame may include a high efficiency (HE) capability information element (IE) that includes the transmit power related information. The MAC header or the PHY header of the data frame may include a high efficiency (HE) control field that includes the transmit power related information. The MAC header or the PHY header of the data frame may include a high efficiency-signal-A (HE-SIG-A) field that includes the transmit power related information.

At block 1406, the first apparatus may be configured to transmit the data frame to a second apparatus (e.g., any STA, AP, or device described herein). In some examples, the first apparatus may be an AP and the second apparatus may be a STA. In other examples, the first apparatus may be a STA and the second apparatus may be a AP.

In some examples, the first apparatus may be configured to generate the data frame in response to a trigger event, as depicted by block 1404. Blocks 1404-1 through 1404-6 provide various examples of trigger events that may cause the first apparatus to generate the data frame including transmit power related information corresponding to the first apparatus. For example, at block 1404-1, the first apparatus may be configured to determine to transmit the transmit power related information. In this example, the trigger event includes the determination to transmit the transmit power related information. Blocks 1404-1A and 1404-1B provide two examples of block 1404-1.

For example, at block 1404-1A, the first apparatus may be configured to determine to transmit the transmit power related information to the second apparatus (e.g., any STA, AP, or device described herein). In this example, the trigger event includes the determination to transmit the transmit power related information to the second apparatus. As another example, at block 1404-1B, the first apparatus may be configured to determine to broadcast the transmit power related information. In this example, the trigger event includes the determination to broadcast the transmit power related information. In some examples, broadcasting information, such as transmit power related information, may refer to the transmission of the information to one or more recipient devices (e.g., any STA, AP, or device described herein).

As another example, at block 1404-2, the first apparatus may be configured to initiate an association procedure with the second device. In this example, the trigger event includes the initiation of the association procedure with the second device. In some examples, an association procedure may refer to a procedure in which two apparatuses (e.g., the first apparatus and the second apparatus) share information about themselves for establishing a connection or the like. As another example, at block 1404-3, the first apparatus may be configured to complete an association procedure with the second apparatus. In this example, the trigger event includes the completion of the association procedure with the second apparatus. As another example, at block 1404-4, the first apparatus may be configured to receive an association procedure request, such as from the second apparatus. In this example, the trigger event includes the reception of the association procedure request.

As another example, at block 1404-5, the first apparatus may be configured to receive a request for the transmit power related information, such as from the second apparatus. In this example, the trigger event includes the reception of the request for the transmit power related information. As another example, at block 1404-6, the first apparatus may be configured to capability information indicative that the second apparatus is capable of processing transmit power related information. In this example, the trigger event includes the reception of the capability information.

Figure 15:
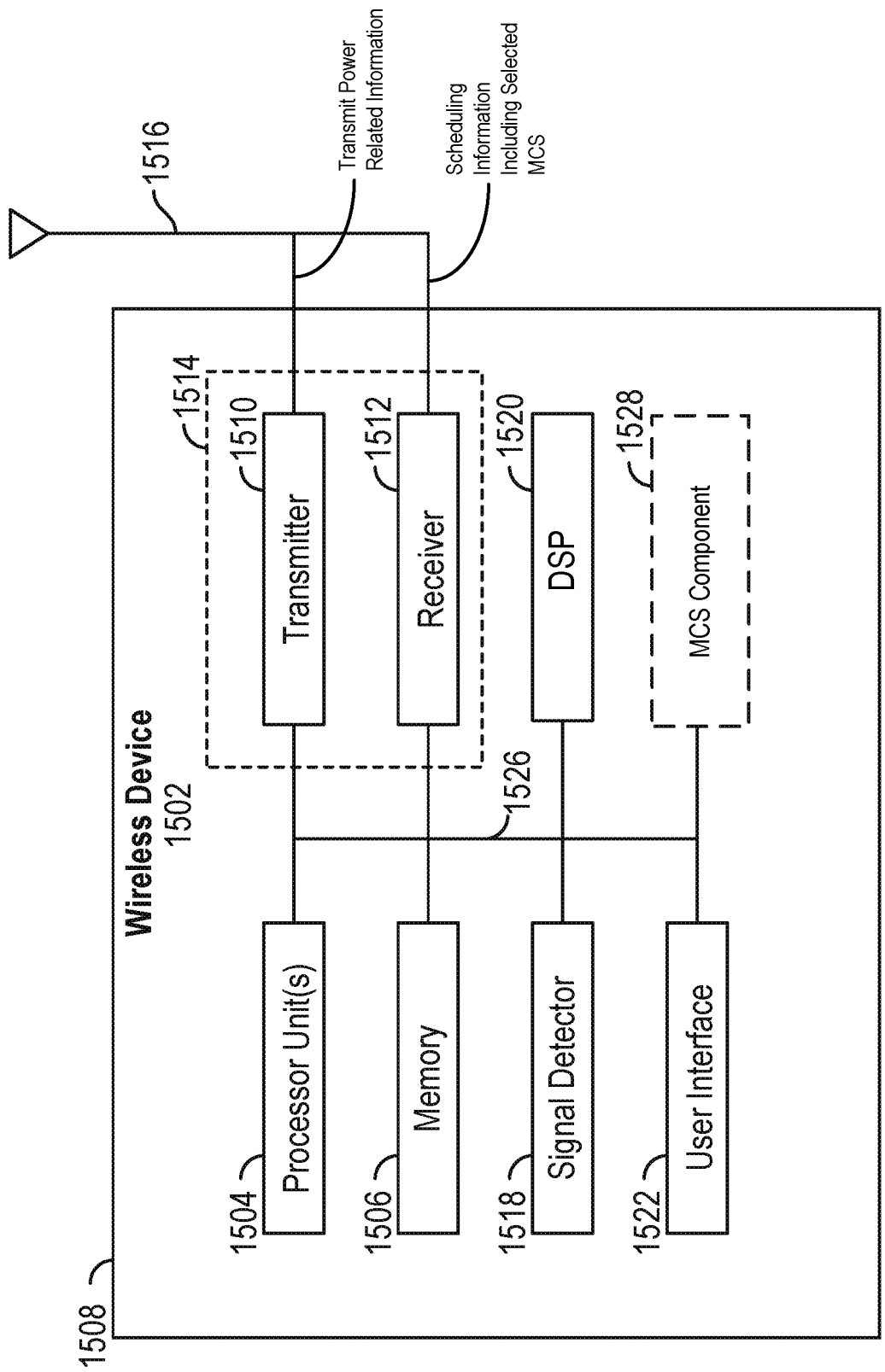
FIG. 15 is a functional block diagram of an example wireless communication device configured in accordance with the techniques described herein.

FIG. 15 is a functional block diagram of an example wireless communication device 1502 configured in accordance with the techniques described herein. The wireless device 1502 is an example of a device that may be configured to implement various techniques described herein. For example, the wireless device 1502 may be an AP or a STA described herein.

The wireless device 1502 may include a processor 1504 configured to control the operation of the wireless device 1502. The processor 1504 may, in some examples, be referred to as a central processing unit (CPU). Memory 1506 may include both read-only memory (ROM) and random access memory (RAM). The processor 1504 may be configured to receive instructions and data from the memory 1506. A portion of the memory 1506 may also include non-volatile random access memory (NVRAM). The processor 1504 may be configured to perform logical and arithmetic operations based on program instructions stored in the memory 1506. The instructions in the memory 1506 may be executable (by the processor 1504, for example) to implement the techniques described herein.

The processor 1504 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 1502 may also include a housing 1508, and the wireless device 1502 may include a transmitter 1510 and/or a receiver 1512 to allow transmission and/or reception of information between the wireless device 1502 and a another device. The transmitter 1510 and the receiver 1512 may be combined into a transceiver 1514. An antenna 1516 may be attached to the housing 1508 and electrically coupled to the transceiver 1514. The wireless device 1502 may also include multiple transmitters, multiple receivers, multiple transceivers, and/or multiple antennas.

The wireless device 1502 may also include a signal detector 1518 that may be configured to detect and quantify the level of signals received by the transceiver 1514 or the receiver 1512. The signal detector 1518 may be configured to detect such signals and be configured to measure signal metrics such as total energy, energy per subcarrier per symbol, power spectral density, and other signal metrics. The wireless device 1502 may also include a digital signal processor (DSP) 1520 for use in processing signals. The DSP 1520 may be configured to generate a packet for transmission. In some aspects, the packet may comprise a physical layer convergence procedure (PLCP) protocol data unit (PPDU).

The wireless device 1502 may further comprise a user interface 1522 in some examples. The user interface 1522 may comprise a keypad, a microphone, a speaker, and/or a display. The user interface 1522 may include any element or component configured to convey information to a user of the wireless device 1502 and/or configured to receive input from the user. The wireless device 1502 may also include an MCS component 1528. In some examples, the MCS component 1528 may be a component of the processor 1504. The MCS component 1528 may be configured to perform any processing (e.g., functions, steps, or the like) described herein with respect to transmit power related information.

For example, the MCS component 1528 may be configured to generate a message including transmit power related information corresponding to the wireless device 1502. The MCS component 1528 may be configured to send the message to the transmitter 1510. The transmitter 1510 may be configured to transmit the message. In some examples, the MCS component 1528 may be configured to receive (e.g., from the receiver 1512) scheduling information including a selected MCS. The receiver 1512 may be configured to receive scheduling information including the selected MCS from a second apparatus (e.g., any device described herein, such as a STA or AP). The MCS component 1528 may be configured to schedule an uplink transmission with the second apparatus in accordance with the selected MCS.

As another example, the MCS component 1528 may be configured to generate a data frame including a Medium Access Control (MAC) header or a physical layer (PHY) header. The MAC header or the PHY header of the data frame may include transmit power related information corresponding to the wireless device 1502. The MCS component 1528 may be configured to send the data frame to the transmitter 1510. The transmitter 1510 may be configured to transmit the data frame. In some examples, the MCS component 1528 may be configured to receive (e.g., from the receiver 1512) scheduling information including a selected MCS. The receiver 1512 may be configured to receive scheduling information including the selected MCS from a second apparatus (e.g., any device described herein, such as a STA or AP). The MCS component 1528 may be configured to schedule an uplink transmission with the second apparatus in accordance with the selected MCS.

The various components of the wireless device 1502 may be coupled together by a bus system 1526. The bus system 1526 may include a data bus, for example, as well as a power bus, a control signal bus, and a status signal bus in addition to the data bus. Components of the wireless device 1502 may be coupled together or accept or provide information to each other using some other mechanism.

Although a number of separate components are illustrated in FIG. 15, one or more of the components may be combined or commonly implemented. For example, the processor 1504 may be used to implement not only the functionality described above with respect to the processor 1504, but also to implement the functionality described above with respect to the signal detector 1518, the DSP 1520, the user interface 1522, and/or the MCS component 1528. Further, each of the components illustrated in FIG. 15 may be implemented using a plurality of separate elements.

Figure 16:
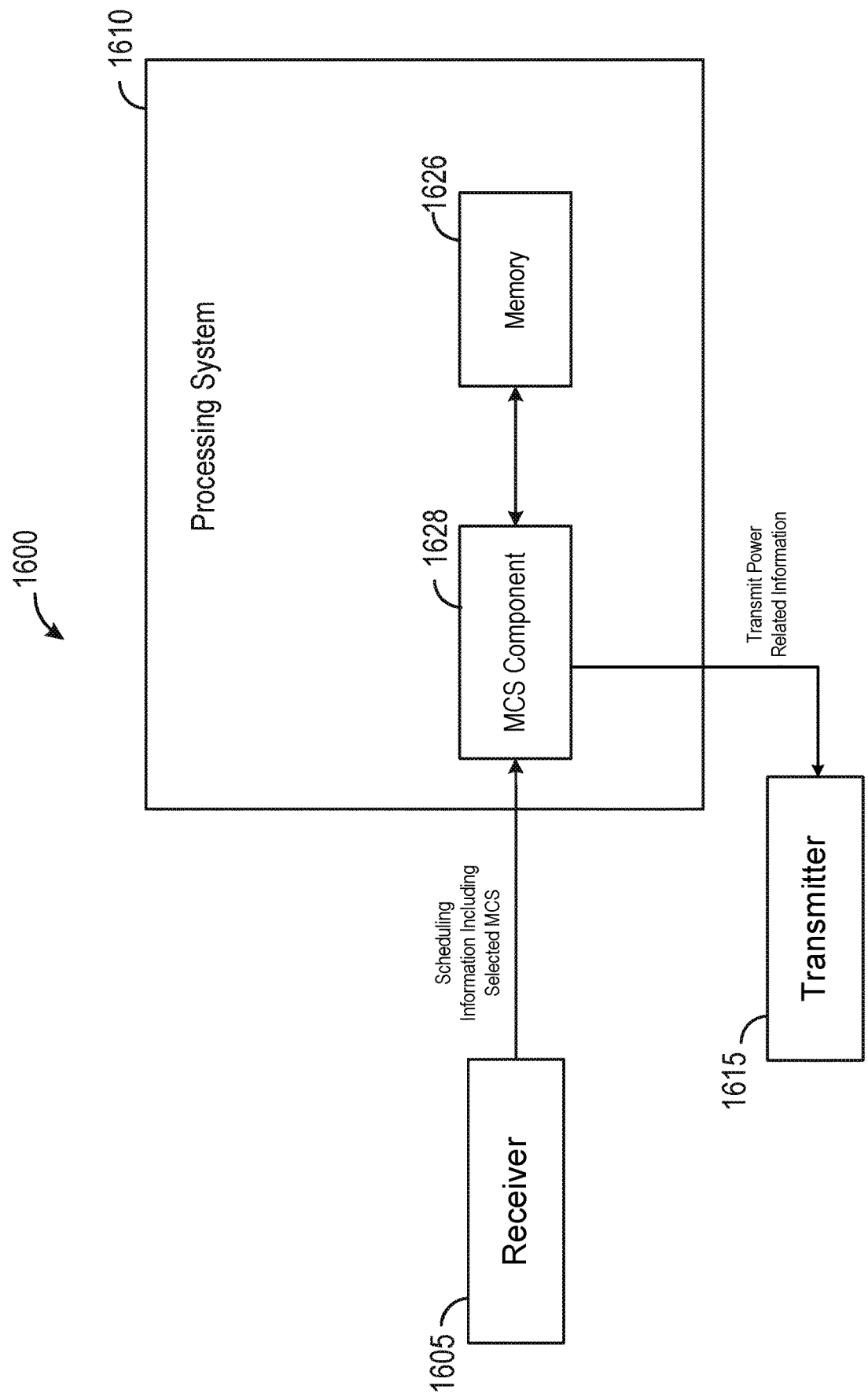
FIG. 16 is a functional block diagram of an example wireless communication device configured in accordance with the techniques described herein.

FIG. 16 is a functional block diagram of an example wireless communication device 1600 configured in accordance with the techniques described herein. The wireless device 1600 is an example of a device that may be configured to implement various techniques described herein. For example, the wireless device 1600 may be an AP or a STA described herein. The wireless communication device 1600 may be configured to receive or send transmit power related information. The wireless communication device 1600 may include a receiver 1605, a processing system 1610, and a transmitter 1615. The processing system 1610 may include an MCS component 1628 and/or a memory 1626. The receiver 1605, the processing system 1610, the transmitter 1615, the memory 1626, and/or the MCS component 1628 may be configured to perform one or more techniques described herein. For example, the receiver 1605, the processing system 1610, the transmitter 1615, the memory 1626, and/or the MCS component 1628 may be configured to perform one or more techniques described with respect to an AP or STA of FIG. 1, an AP or STA of FIG. 2, the first device or second device of FIG. 7, the first apparatus configured to perform the method described with respect to FIG. 13, or the first apparatus configured to perform the method described with respect to FIG. 14, or the wireless device of FIG. 15. For example, the receiver 1605 may be configured to perform any receiving function. As another example, transmitter 1615 may be configured to perform any transmitting function. As another example, the MCS component 1628 may be configured to process scheduling information including a selected MCS. As another example, the MCS component 1628 may be configured to generate a message, frame, data frame, or the like that includes transmit power related information.

In some examples, the receiver 1605 may correspond to the receiver 1512. The processing system 1610 may correspond to the processor 1504. The transmitter 1615 may correspond to the transmitter 1510. The MCS component 1628 may correspond to the MCS component 1528.

In some examples, the wireless communication device 1600 may include means for performing the functions described herein. For example, means for performing the functions described herein may include one or more of the receiver 1605, the processing system 1610, the MCS component 1628, the memory 1626, and/or the transmitter 1615.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an application specific integrated circuit (ASIC), an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disk (CD)-ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method operations (or blocks) and/or actions may be interchanged with one another without departing from the scope of the claims. In other words, unless a specific order of operations or actions is specified, the order and/or use of specific operations and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of this disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method for wireless communication, comprising:
    generating, by a first device, a data frame including a Medium Access Control (MAC) header or a physical layer (PHY) header, wherein the MAC header or the PHY header of the data frame includes transmit power related information corresponding to the first device, wherein the transmit power related information includes at least one of: a maximum transmit power, power backoff per modulation and coding scheme information, or an actual transmit power; and
    transmitting, by the first device, the data frame to a second device.

2. The method of claim 1, wherein generating the data frame includes generating the data frame in response to a trigger event.

3. The method of claim 2, further comprising:
    determining, by the first device, to transmit the transmit power related information, wherein the trigger event includes the determination to transmit the transmit power related information.

4. The method of claim 3, wherein determining to transmit the transmit power related information includes:
    determining, by the first device, to transmit the transmit power related information to the second device, wherein the trigger event includes the determination to transmit the transmit power related information to the second device; or
    determining, by the first device, to broadcast the transmit power related information, wherein the trigger event includes the determination to broadcast the transmit power related information.

5. The method of claim 2, further comprising:
    initiating, by the first device, an association procedure with the second device, wherein the trigger event includes the initiation of the association procedure with the second device.

6. The method of claim 2, further comprising:
    completing, by the first device, an association procedure with the second device, wherein the trigger event includes the completion of the association procedure with the second device.

7. The method of claim 2, further comprising:
    receiving, by the first device, an association procedure request, wherein the trigger event includes the reception of the association procedure request.

8. The method of claim 2, further comprising:
    receiving, by the first device, a request for the transmit power related information, wherein the trigger event includes the reception of the request for the transmit power related information.

9. The method of claim 8, wherein receiving the request for the transmit power related information includes:
    receiving, by the first device, the request for the transmit power related information from the second device.

10. The method of claim 2, further comprising:
    receiving, by the first device from the second device, capability information indicative that the second device is capable of processing transmit power related information, wherein the trigger event includes the reception of the capability information.

11. The method of claim 1, wherein the maximum transmit power corresponds to a maximum output power at an antenna port of a transmitter of the first device.

12. The method of claim 1, wherein the MAC header or the PHY header of the data frame includes a high efficiency (HE) capability information element (IE) that includes the transmit power related information.

13. The method of claim 1, wherein the MAC header or the PHY header of the data frame includes a high efficiency (HE) control field that includes the transmit power related information.

14. The method of claim 1, wherein the MAC header or the PHY header of the data frame includes a high efficiency-signal-A (HE-SIG-A) field that includes the transmit power related information.

15. A first device, comprising:
a memory configured to store data; and
one or more processors communicatively coupled with the memory, wherein the one or more processors are configured to:
generate a data frame including a Medium Access Control (MAC) header or a physical layer (PHY) header, wherein the MAC header or the PHY header of the data frame includes transmit power related information corresponding to the first device, wherein the transmit power related information includes at least one of: a maximum transmit power, power backoff per modulation and coding scheme information, or an actual transmit power;
store the data frame in the memory; and
transmit the data frame to a second device.

16. The first device of claim 15, wherein to generate the data frame, the one or more processors are configured to generate the data frame in response to a trigger event.

17. The first device of claim 16, wherein the one or more processors are configured to:
determine to transmit the transmit power related information, wherein the trigger event includes the determination to transmit the transmit power related information.

18. The first device of claim 17, wherein to determine to transmit the transmit power related information, the one or more processors are configured to:
determine to transmit the transmit power related information to the second device, wherein the trigger event includes the determination to transmit the transmit power related information to the second device; or
determine to broadcast the transmit power related information, wherein the trigger event includes the determination to broadcast the transmit power related information.

19. The first device of claim 16, wherein the one or more processors are configured to:
initiate an association procedure with the second device, wherein the trigger event includes the initiation of the association procedure with the second device.

20. The first device of claim 16, wherein the one or more processors are configured to:
complete an association procedure with the second device, wherein the trigger event includes the completion of the association procedure with the second device.

21. The first device of claim 16, wherein the one or more processors are configured to:
receive an association procedure request, wherein the trigger event includes the reception of the association procedure request.

22. The first device of claim 16, wherein the one or more processors are configured to:
receive a request for the transmit power related information, wherein the trigger event includes the reception of the request for the transmit power related information.

23. The first device of claim 22, wherein to receive the request for the transmit power related information, the one or more processors are configured to:
receive the request for the transmit power related information from the second device.

24. The first device of claim 16, wherein the one or more processors are configured to:
receive capability information indicative that the second device is capable of processing transmit power related information, wherein the trigger event includes the reception of the capability information.

25. The first device of claim 15, wherein the maximum transmit power corresponds to a maximum output power at an antenna port of a transmitter of the first device.

26. The first device of claim 15, wherein the MAC header or the PHY header of the data frame includes a high efficiency (HE) capability information element (IE) that includes the transmit power related information.

27. The first device of claim 15, wherein the MAC header or the PHY header of the data frame includes a high efficiency (HE) control field that includes the transmit power related information.

28. The first device of claim 15, wherein the MAC header or the PHY header of the data frame includes a high efficiency-signal-A (HE-SIG-A) field that includes the transmit power related information.

29. A first apparatus for wireless communications, comprising:
means for generating a data frame including a Medium Access Control (MAC) header or a physical layer (PHY) header, wherein the MAC header or the PHY header of the data frame includes transmit power related information corresponding to a second device, wherein the transmit power related information includes at least one of: a maximum transmit power, power backoff per modulation and coding scheme information, or an actual transmit power; and
means for transmitting the data frame to a second apparatus.

30. A non-transitory computer-readable medium having instructions stored thereon that, when executed, cause one or more processors of a first device to:
generate a data frame including a Medium Access Control (MAC) header or a physical layer (PHY) header, wherein the MAC header or the PHY header of the data frame includes transmit power related information corresponding to the first device, wherein the transmit power related information includes at least one of: a maximum transmit power, power backoff per modulation and coding scheme information, or an actual transmit power; and
transmit the data frame to a second device.

* * * * *